US008953699B2

(12) United States Patent
Sayana et al.

(10) Patent No.: US 8,953,699 B2
(45) Date of Patent: Feb. 10, 2015

(54) METHOD AND APPARATUS FOR CSI FEEDBACK FOR JOINT PROCESSING SCHEMES IN AN ORTHOGONAL FREQUENCY DIVISION MULTIPLEXING COMMUNICATION SYSTEM WITH COORDINATED MULTI-POINT TRANSMISSION

(71) Applicant: Motorola Mobility LLC, Libertyville, IL (US)

(72) Inventors: Krishna Kamal Sayana, San Jose, CA (US); Robert T. Love, Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 52 days.

(21) Appl. No.: 13/669,710

(22) Filed: Nov. 6, 2012

(65) Prior Publication Data
US 2013/0114656 A1 May 9, 2013

Related U.S. Application Data

(60) Provisional application No. 61/556,637, filed on Nov. 7, 2011.

(51) Int. Cl.
*H04B 7/02* (2006.01)
*H04B 7/06* (2006.01)
(52) U.S. Cl.
CPC .............. *H04B 7/024* (2013.01); *H04B 7/0632* (2013.01); *H04B 7/0634* (2013.01); *H04B 7/0639* (2013.01)
USPC ........... 375/267; 370/252; 375/299; 375/347; 455/101

(58) Field of Classification Search
None
See application file for complete search history.

(56) References Cited

U.S. PATENT DOCUMENTS

2008/0146154 A1 6/2008 Claussen et al.
2010/0239036 A1 9/2010 Koo et al.
(Continued)

OTHER PUBLICATIONS

"3rd Generation Partnership Project; Technical Specification Group Radio Access Network; Coordinated Multi-Point Operation for LTE Physical Layer Aspects (Release 11)", 3GPP Standard; 3GPP TR 36.819, 3rd Generation Partnership Project (3GPP), Mobile Competence Centre., 650, Route Des Lucioles, F-06921 Sophia-Antipolis Cedex, France, vol. RAN WG1, No. V2.0.0, Sep. 21, 2011, pp. 1-70, XP050553802, all pages.

(Continued)

*Primary Examiner* — Adolf Dsouza
(74) *Attorney, Agent, or Firm* — Faegre Baker Daniels LLP

(57) ABSTRACT

Methods in a wireless terminal are described for supporting co-ordinated multipoint transmissions including joint transmissions from two or more transmission points, specifically the method of receiving indication of two or more CSI reference signal configurations, each CSI reference signal configuration representing one or more antenna ports comprising a set of antenna ports; determining a first set of transmission parameters corresponding to a first set of antenna ports corresponding to a first CSI reference signal configuration and a second set of transmission parameters corresponding to a second set of antenna ports corresponding to a second CSI reference signal configuration; the first set and second set of transmission parameters determined to maximize the sum data rate for simultaneous transmission from the first set and the second set of antenna ports; conveying, to the base station, information pertaining to the first set of transmission parameters and the second set of transmission parameters.

32 Claims, 14 Drawing Sheets

(56) References Cited

U.S. PATENT DOCUMENTS

| | | |
|---|---|---|
| 2010/0322351 A1 | 12/2010 | Tang et al. |
| 2011/0110239 A1 | 5/2011 | Blanz et al. |
| 2011/0243026 A1 | 10/2011 | Kim et al. |
| 2011/0269459 A1 | 11/2011 | Koo et al. |
| 2011/0274188 A1 | 11/2011 | Sayana et al. |
| 2012/0207055 A1 | 8/2012 | Kang et al. |

OTHER PUBLICATIONS

Samsung: "Discussion on CoMP with Implicit CQI Feedback", 3GPP Draft; RI-094093 Discussion on Comp With Implicit CQI Feedback, 3rd Generation Partnership Project (3GPP), Mobile Competence Centre; 650, Route Des Lucioles; F-06921 Sophia-Antipolis Cedex; France, vol. RAN WGI, no. Miyazaki; Oct. 12, 2009 Oct. 16, 2009, Oct. 6, 2009, XP050597765, all pages.

Nokia Siemens Networks et al: "Downlink feedback framework for LTE-Advanced", 3GPP Draft; RI-093912 Downlink Comp Feedback Framework, 3rd Generation Partnership Project (3GPP), Mobile Competence Centre ; 650, Route Des Lucioles ; F-06921 Sophia-Antipolis Cedex; France, vol. RAN WGI, no. Miyazaki; Oct. 12, 2009 Oct. 16, 2009, Oct. 5, 2009, XP050597738, all pages.

Pantech: "Uniform CSI feedback for both JP CoMP and CS CoMP", 3GPP Draft; R1-110757, 3rd Generation Partnership Project (3GPP), Mobile Competence Centre ; 650, Route Des Lucioles ; F-06921 Sophia-Antipolis Cedex; France, vol. RAN WGI, no. Taipei, Taiwan; Feb. 21, 2011, Feb. 15, 2011, XP050490555, all pages.

China Telecom ZTE: "Consideration of CSI feedback for CoMP", 3GPP Draft; RI-113285 Consideration on CSI Feedback for Comp, 3rd Generation Partnership Project (3GPP), Mobile Competence Centre ; 658, Route Des Lucioles ; F-86921 Sophia-Antipolis Cedex; France, vol. RAN WG1, no. Zhuhai, Oct. 10, 2011, Oct. 3, 2011, XP85838892, [retrieved on Oct. 3, 2011] p. 3, lines 1-9.

Erik Dahlman et al: "4G LTE/LTE—Advanced for Mobile Broadband—Chapter 10" In: "4G LTE/LTE—Advanced for Mobile Broadband—Chapter 10", Mar. 29, 2011, XP055046016, pp. 145-202.

Patent Cooperation Treaty, International Search Report and Written Opinion of the International Searching Authority for International Application No. PCT/US2012/063663, Jan. 28, 2013, 17 pages.

Huawei, Hisilicon: "Framework for multi-point CSI feedback enhancements for CoMP", 3GPP TSG RAN WG1 Meeting #66bis, Zhuhai, China, Oct. 10-14, 2011. R1-112896, all pages.

Motorola Mobility: "Phase-2 Evaluations of Joint Transmission (JT) and Dynamic Cell Selection (DCS) Schemes", 3GPP TSG RAN1 #66, Athens, Greece, Aug. 22-26, 2011, R1-112440, all pages.

Motorola Mobility: "Coordinated Scheduling (CS) Schemes with Low Power RRH: Details and Phase-2 Evaluations Results", 3GPP TSG RAN1 #66, Athens, Greece, Aug. 22-26, 2011, R1-112441, all pages.

Motorola Mobility: "Multi-point Feedback Enhancements for Release-11", 3GPP TSG RAN1 #66bis, Zhuhai, China, Oct. 10-14, 2011, R1-113256, all pages.

US 8,953,699 B2

METHOD AND APPARATUS FOR CSI FEEDBACK FOR JOINT PROCESSING SCHEMES IN AN ORTHOGONAL FREQUENCY DIVISION MULTIPLEXING COMMUNICATION SYSTEM WITH COORDINATED MULTI-POINT TRANSMISSION

FIELD OF THE INVENTION

The present disclosure relates generally to wireless communication systems, and more particularly to rank adaptation in an Orthogonal Frequency Division Multiplexing (OFDM) communication system with multiple transmission points such as geographically separated or distributed antennas.

BACKGROUND OF THE INVENTION

Coordinated Multi-Point (CoMP) transmission/reception has been proposed as a promising technology to meet the 3GPP (Third Generation Partnership Project) LTE-Advanced (LTE-A) requirements by improving performance of cell-edge user equipment (UEs) in particular. In CoMP operation, multiple transmission/reception points cooperatively transmit to or receive from one or more UEs to improve performance, especially for those UEs that would otherwise, in the case of downlink, see significant interference from some transmission points if the transmission points do not cooperate. A transmission point (TP), termed from the perspective of downlink, generally refers to a radio unit controlled by the scheduler in a base station (referred to as an eNodeB or eNB in LTE). A base station may control a single TP, in which case the TP is the same as a base station or an eNB. In this case, the CoMP operation refers to the case that there is coordination among eNBs. In another network architecture, a base station or eNB may control multiple transmission points (TPs), which often are referred to as radio units or radio heads. In this case, coordination among TPs will happen naturally, and is easier to achieve since they are controlled by a centralized scheduler within the eNB.

In general, CoMP techniques refer to a broad range of coordination mechanisms including interference avoidance. One such technique is joint-transmission where antennas from two or more TPs are used together in a multi-antenna multi-input multi-output (MIMO) transmission to a UE. More generally, one can consider distributed antenna type of deployments where a transmission to a terminal may be from antennas distributed geographically. Clearly, the difference from a conventional MIMO operation is that the antennas are not necessarily co-located.

In some network deployments, TPs may be co-located, in which case it is feasible to connect them to a single eNB. An example is the well-known three-sector/cell deployment where a single eNB has three service areas, referred to as sectors or cells. In some other deployments, TPs may be geographically separated, in which case they can be controlled by either separate eNBs or a single eNB. In the former case, TPs are typically under the control of separated schedulers that may coordinate in a peer-to-peer fashion. Different types of eNBs with possibly different transmission powers constitute a so-called heterogeneous network. In the case of geographically separated TPs controlled by a single eNB, the TPs, often referred to as remote radio units (RRUs) or remote radio heads (RRHs), connect to a single eNB via optical fiber, and a centralized scheduler controls/coordinates all the TPs.

Each TP, whether co-located or geographically separated, may form its own logical cell, or multiple TPs may form a single logical cell. From a user equipment (UE) perspective, a cell is defined as a logical entity that a UE receives data from and transmits data to, in other words, "serves" the UE. The cell that serves a UE is called the "serving cell." The geographic area covered by the logical entity sometimes also is referred to as a cell, such as when a cell-edge UE is mentioned to describe a UE located at the edge of the coverage area. A cell usually has an associated cell identifier (cell-ID). A cell-ID is typically used to specify the pilot signals (also referred to as reference signals) that may be unique to the cell and scramble the data transmitted to the UEs "attached" to, that is, served by, that cell.

In conventional non-CoMP multi-antenna (MIMO) operation, a single TP, which is the serving cell of a UE, adapts the transmission parameters based on the quality of the link to the UE. In this so-called "link adaptation" as commonly adopted in modern wireless communications, a UE needs to estimate a channel quality of a hypothetical data transmission which is traditionally from a single cell for non-CoMP operation. Channel quality is often represented as a modulation and coding scheme (MCS) that could be received by the UE with an error probability not exceeding a particular threshold. The UE may also feed back some recommendation of spatial transmission parameters, such as transmission rank indication (RI), precoding matrix index (PMI), and the like. In CoMP operation, the transmission from multiple points also needs to adapt to the link condition as seen by the UE.

The UE relies on pilot signals (also known as reference signals (RSs)) sent from a serving cell for channel estimation and for channel quality measurements that are reported back to the eNB. Often the reference signals are scrambled with a sequence specific to a cell-ID of that particular serving cell. In order to estimate a channel and to make channel quality measurements, the eNB must have a mechanism that enables the UE to estimate the channel and also measure the interference. The usual mechanism to enable the channel estimation by the UE is for the eNB to send pilot signals from each of the transmit antennas, which essentially sound the channel. A pilot signal is a waveform or sequence known by both the transmitter and receiver. In OFDMA systems, the pilot signals usually correspond to a pilot sequence on a set of time-frequency resource elements (REs) within a time/frequency grid, where a resource element is a subcarrier in OFDM transmission. The UE would then use the pilot signals to compute channel estimates at each subcarrier location by performing interpolation and noise suppression, and to measure a channel quality. Further pilot signals are also needed at the UE to construct the "effective" channel for purpose of coherent demodulation. An effective channel, corresponding to one or more data streams or layers of a UE, is the precoded/beam-formed channel that a UE's receiver effectively sees applied to a data modulation signal at the receiver.

In Releases 8 and 9 of the 3GPP LTE standards, Common or Cell-Specific reference signals (CRS) (and, in Release 10, Channel State Information Reference Signals (CSI-RSs)), corresponding to a set of CRS ports (CSI-RS ports in Release 10), are sent from an eNB and are intended for all UEs in a cell served by the eNB. The CRS ports could correspond to the set of physical antennas at an eNB or a set of virtualized antennas observable at all UEs served by the eNB. These RSs may be used for channel estimation for channel quality and/or for spatial feedback measurements. A UE can compute and report a recommended PMI from a pre-defined codebook, as well as providing associated RI and CQI (Channel Quality Information, or Indication) feedback, for maximizing the total rate of transmission (or sum CQI) at the UE.

Broadly, joint processing (JP) schemes refer to either i) Joint Transmission (JT) (where data is transmitted to a UE from two or more TPs) or ii) Dynamic Point Selection (DPS) (where data is dynamically transmitted from one of the two or more TPs). The term joint processing refers to the fact that the two TPs should be able to process the data intended for a UE at any time. Further, if at least one data stream is sent simultaneously from two or more TPs, it is referred to as a coherent joint transmission (which requires some phase alignment) and if independent data streams are sent from each TP, it is referred to as non-coherent JT.

Timing Issue

The LTE system is primarily designed, and test cases were setup, with the implicit assumption that the antenna ports represented by the CRS/CSI-RS ports are co-located. Typically in those cases, the individual antennas can be assumed to be calibrated. Accordingly, the codebooks and the CSI feedback approaches are defined based on these implicit behaviors. However, in a CoMP communication system, RRUs/RRHs, and corresponding antenna ports, chosen for transmission (for example, the two closest RRUs/RRHs) to a UE may have different path losses. That is, the signals from each RRU/RRH/antenna port may propagate over a completely different path and/or the UE may be much closer to one RRU/RRH/antenna port than the other, with the result that the UE may see a much larger time delay from one chosen antenna port than another chosen antenna port. This is especially true in the case of small cell or indoor deployments, where a UE may come very close to one of the antennas. Such time delay may introduce frequency selective phase rotation between groups of antennas from different eNBs, in which case coherent joint MIMO transmission from non-colocated groups of antennas may be challenging.

Feedback Overhead

Further, in these systems, to support joint transmission a UE has to feedback the CSI information assuming joint transmission from the aggregated set of antennas corresponding to the transmission points. Such CSI could include information related to the transmission rank, which is essentially the number of spatial streams transmitted to a UE, the channel quality index information, which is essentially the modulation and coding scheme (MCS) that can be supported on each of the codewords that may be mapped to the spatial streams, and the precoding matrix index, which is the precoding weights used on the aggregated set of antennas The above determination of CSI is a straightforward extension of the existing procedures supported in LTE Release-8/9/10 specifications. However, the base station may need the flexibility to fall back to a single TP transmission (one set of colocated antennas/group of antennas) due to practical reasons like cell loading, traffic patterns etc., In which case, it will need access to CSI feedback related to individual TPs, otherwise referred to as per-TP feedback. So for example, if two TPs are considered, the total overhead could be three times the original overhead supported for a single TP feedback, since feedback needs to be supported assuming i) Joint transmission from two TPs ii) transmission from first TP and iii) transmission from second TP. Such three-fold increase is not desirable and further optimization is needed to achieve such operations at the base station with smaller increase in feedback overhead.

We address optimizing CSI feedback to support JP including non-coherent JT, Dynamic Point Selection (DPS) and possibly coherent JT.

Figure 1:
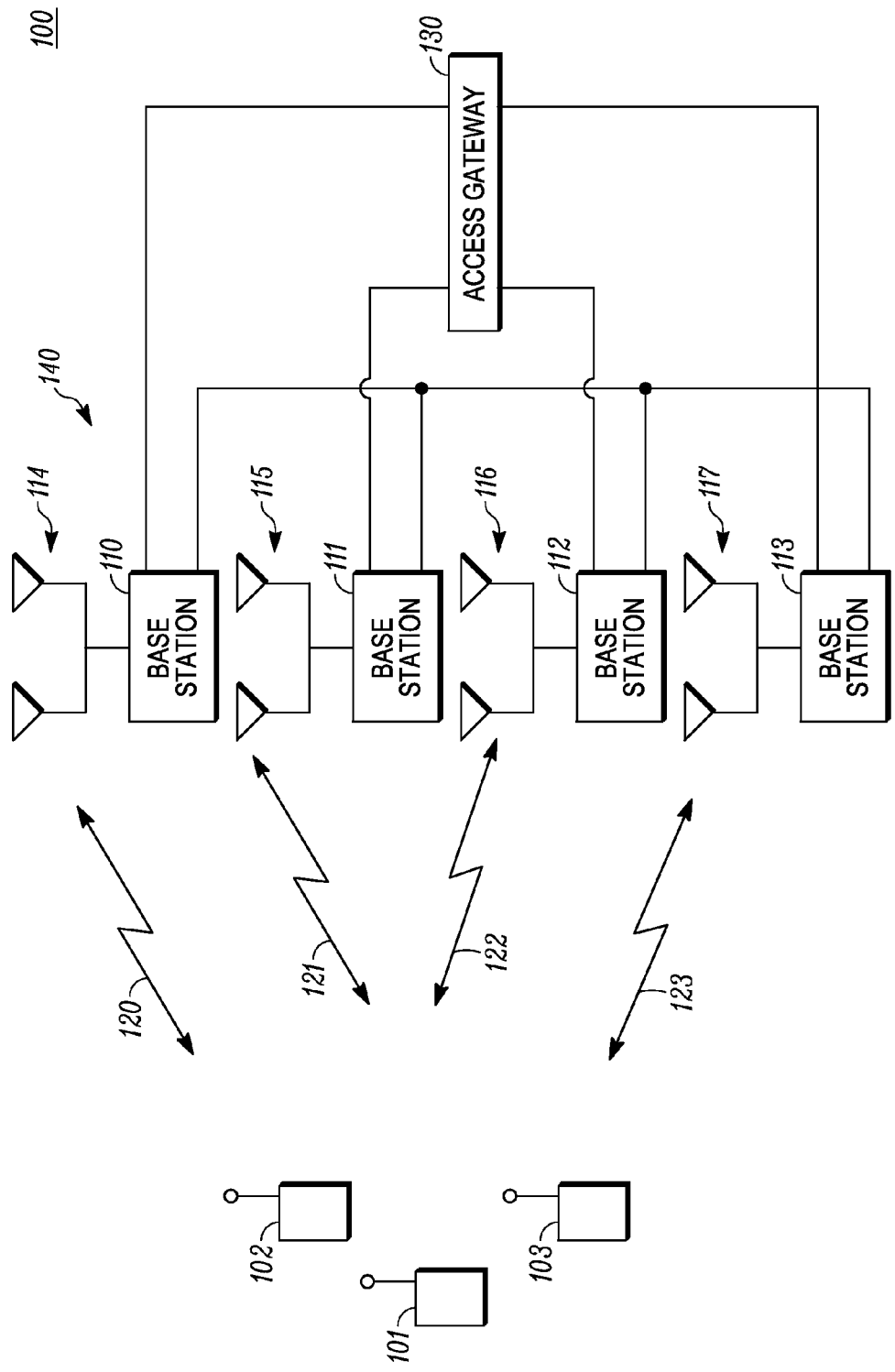
FIG. 1 is a block diagram of a wireless communication system in accordance with an embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (for example, a CPU) or specialized processing apparatus (for example, a DSP). It will also be understood that the terms and expressions used herein have the ordinary technical meaning as is accorded to such terms and expressions by persons skilled in the technical field as set

DETAILED DESCRIPTION OF THE INVENTION

Generally, an embodiment of the present invention encompasses a method in a wireless communication terminal communicating with a base unit comprising: receiving indication of two or more CSI reference signal configurations, each CSI reference signal configuration representing one or more antenna ports comprising a set of antenna ports; determining a first set of transmission parameters corresponding to a first set of antenna ports corresponding to a first CSI reference signal configuration and a second set of transmission parameters corresponding to a second set of antenna ports corresponding to a second CSI reference signal configuration; the first set and second set of transmission parameters determined to maximize the sum data rate assuming simultaneous transmission from the first set and the second set of antenna ports; conveying, to the base station, information pertaining to the first set of transmission parameters and the second set of transmission parameters. The method further comprising a first single codeword transmission from the first set of antenna ports and a second single codeword transmission from the second set of antenna ports and the first and second set of transmission parameters correspond to a set of downlink time frequency resources that overlap.

Another embodiment of the present invention encompasses a method in a wireless terminal comprising, receiving indication of two or more CSI reference signal configurations, each CSI reference signal configuration representing one or more antenna ports comprising a set of antenna ports; determining a first set of transmission parameters corresponding to a first set of antenna ports corresponding to a first CSI reference signal configuration where first set of transmission parameters includes a first transmission rank; determining a second set of transmission parameters corresponding to a second set of antenna ports corresponding to a second CSI reference signal configuration, where second set of transmission parameters includes a second transmission rank; deriving a third transmission rank from the first and second transmission ranks; determining a third set of transmission parameters corresponding to a joint transmission from the first and second set of antenna ports, assuming the third transmission rank; conveying, to the base station, information pertaining to one or more of the first set of transmission parameters, the second set of transmission parameters and the third set of transmission parameters.

Yet another embodiment of the present invention comprises a method in a wireless terminal comprising receiving indication of two or more CSI reference signal configurations, each CSI reference signal configuration representing one or more antenna ports comprising a set of antenna ports; determining transmission parameters based on transmission from a first set of antenna ports corresponding to a first CSI reference signal configuration and a second set of antenna ports corresponding to a second CSI reference signal configuration; the transmission parameters including a codebook which indicates the transmission weight vectors from the first set and the second set of antenna ports; the codebook includes a first set of one or more diagonal entries corresponding to transmission of a first set of spatial layers from first set of antenna ports and a second set of spatial layers from the second set of antenna ports; the codebook includes a second set of entries assuming transmission of the one or more spatial layers from the first set of antenna ports and assuming the second set of antenna ports are not transmitting or transmitting based on a fixed hypothesis for transmission; conveying back the preferred codebook index to the basestation. In one embodiment, the codebook further includes a third set of entries assuming transmission of one or more spatial layers, each spatial layer transmitted simultaneously from both the first and second set of antenna ports.

Still another embodiment of the present invention comprises a method in a user equipment for communicating with a base station, method comprising, receiving indication of two or more CSI reference signal configurations, each CSI reference signal configuration representing one or more antenna ports comprising a set of antenna ports; selecting a first set of subbands corresponding to a first set of antenna ports corresponding to a first CSI reference signal configuration and a second set of subbands corresponding to a to a second set of antenna ports corresponding to a second CSI reference signal configuration; determining a first set of transmission parameters corresponding to the first set of antenna ports on the first set of subbands and a second set of transmission parameters corresponding to the second set of antenna ports on the second set of subbands; conveying, to the base station, information pertaining to the first set of transmission parameters and the second set of transmission parameters and the first set and the second set of subbands.

Yet another embodiment of the present invention comprises a method in a base station comprising, sending indication of two or more CSI reference signal configurations, each CSI reference signal configuration representing one or more antenna ports comprising a set of antenna ports; receiving information pertaining to the first set of transmission parameters corresponding to a first set of antenna ports corresponding to a first CSI reference signal configuration and a second set of transmission parameters corresponding to a second set of antenna ports corresponding to a second CSI reference signal configuration; the first set and second set of transmission parameters determined assuming a simultaneous first single codeword transmission from the first set of antenna ports on a first downlink time frequency resource and a second single codeword transmission from the second set of antenna ports on a second downlink time frequency resource where the first and second time frequency resources overlap.

Still another embodiment of the present invention comprises a method in a base station comprising sending indication of two or more CSI reference signal configurations, each CSI reference signal configuration representing one or more antenna ports comprising a set of antenna ports; receiving information pertaining to transmission parameters corresponding to a transmission from a first set of antenna ports corresponding to a first CSI reference signal configuration and a second set of antenna ports corresponding to a second CSI reference signal configuration; the transmission parameters including a codebook which indicates the transmission weight vectors from the first set and second set of antenna ports; the codebook includes a first set of one or more diagonal entries corresponding to transmission of a first set of spatial layers from the first set of antenna ports and a second set of spatial layers from the second set of antenna ports; the codebook includes a second set of entries assuming transmission of one or more spatial layers from the first set of antenna ports and assuming no transmission on the second set of antenna ports or assuming transmission on the second set of antenna ports based on a fixed hypothesis for transmission; In one embodiment, the codebook further includes a third set of entries assuming transmission of one or more spatial layers, each spatial layer transmitted simultaneously from both the first and second set of antenna ports.

The present invention may be more fully described with reference to FIGS. 1-16. FIG. 1 is a block diagram of a wireless communication system 100 in accordance with an embodiment of the present invention. Communication system 100 includes multiple user equipment (UE) 101-103 (three shown), such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes an access network 140 comprising multiple base stations (BSs) 110-113 (four shown), such as a Node B, an eNodeB, an Access Point (AP), a Relay Node (RN), or a Base Transceiver Station (BTS) (the terms BS, eNodeB, eNB, NodeB, and BTS are used interchangeably herein), that each includes a scheduler (not shown) and an antenna array 114-117 comprising multiple antennas, that supports Multiple-Input Multiple-Output (MIMO) communications, and that provides communication services, via a corresponding air interface 120-123, to users' equipment (UEs), such as UEs 101-103.

Each BS provides communication services to UEs in a geographic area referred to as a cell or a sector of a cell. Note that a single BS can cover multiple sectors of a cell. The term "cell" is typically used to refer to a sector in this case. More precisely, from a UE perspective, a cell is a logical entity that a UE is communicating with (that is, serves a UE). The cell that serves a UE is called the "serving cell," as opposed to a "non-serving" or potentially interfering cell. A cell usually corresponds to an associated cell identifier (cell-ID). A cell-ID is typically used to specify the pilot signals (also referred to as reference signals (RSs)) and to scramble the data transmitted to the UEs "attached" to (that is, served by) that cell. Each cell can have a single transmission point (TP) in which case the term cell and TP can used interchangeably. Each cell may have multiple TPs (refer to FIG. 2) in which case they are not equivalent.

Each air interface 120-123 comprises a respective downlink and a respective uplink. Each of the downlinks and uplinks comprises multiple physical communication channels, including multiple control/signaling channels and multiple traffic channels. Each BS of the multiple BSs 110-113 is in communication with the other BSs of the multiple BSs via one or more of an access network gateway 130 and an inter-BS interface that may comprise one or more of a wireline link and a wireless link of all of the BSs and via which each BS may broadcast to the other BSs. Access network 140 further includes access network gateway 130. Access network gateway 130 provides access for each of BSs 110-113 to other parts of an infrastructure of communication system 100 and to each other, and may be, for example but not limited to, any one or more of a Radio Network Controller (RNC), a mobile switching center (MSC), a Packet Data Service Node (PDSN), or a media gateway.

Figure 2:
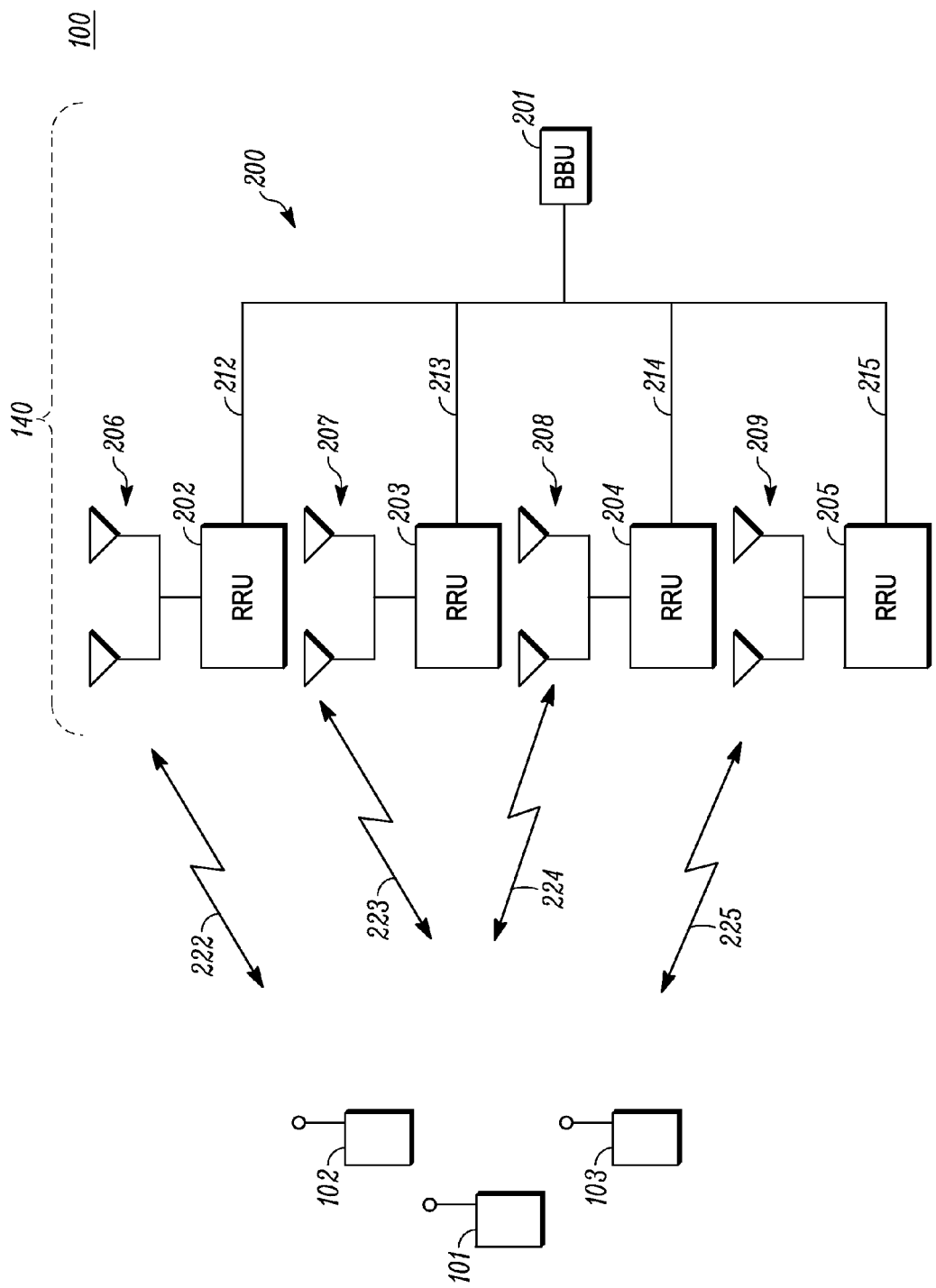
FIG. 2 is a block diagram of a wireless communication system in accordance with another embodiment of the present invention.

Referring now to FIG. 2, a block diagram is provided of wireless communication system 100 in accordance with another embodiment of the present invention. In communication system 100 as depicted in FIG. 2, access network 140 includes a BS 200 whose functionality is distributed among a Base Band Unit (BBU) 201 and multiple Remote Radio Units (RRUs) 202-205 (four shown) coupled to the BBU. Each RRU 202-205 comprises an antenna array 206-209 that includes one or more antennas and further includes other functionality, and is responsible for receiving and transmitting the radio frequency signals from and to a UE, such as UEs 101-103, residing in a coverage area of the RRU via a corresponding air interface 222-225. Each RRU 202-205 can also each be referred to as a TP that is connected to the same BS 200. Each air interface 222-225 comprises a respective downlink and a respective uplink. Each of the downlinks and uplinks comprises multiple physical communication channels, including multiple control/signaling channels and multiple traffic channels. BBU 201 is coupled to each of the multiple RRUs 202-205 by a corresponding backhaul link 212-215, for example, a wireless link or a wired link such as a fiber optic network. Typically the scheduler resides with a BBU.

In still other embodiments of the present invention, communication system 100 may comprise system that is a combination of the embodiments depicted in FIGS. 1 and 2.

TPs may be co-located, in which case it is very feasible to connect them to a single BS. An example is a typical three-sector deployment where a single BS controls three service areas referred to as sectors/cells. TPs may be geographically separated, hence the term "remote radio units" (RRUs) or "remote radio heads" (RRHs). An example of geographically separated TPs is a deployment scenario of a heterogeneous network that is comprised of different types of BSs with varying transmission powers.

A UE may receive transmission from a single RRU or more than one RRU. For example, a UE, such as UE 101, may be located in a coverage area served by RRU pair 203, 204 and could receive joint transmissions from these two RRUs. In this case, RRUs 203 and 204 may be referred to as serving RRUs and RRU 205 as a non-serving RRU (or potentially interfering RRU), all from UE 101's perspective only. Similarly UE 103 may receive transmissions from RRU pair 204 and 205. But UE 103 may be closer to RRU 204 and thus a central scheduler may decide to use only RRU 204 to serve UE 103. BS 200 may determine the serving and non-serving RRUs for each UE considering the performance of the part of network 100 in its control, based on some UE feedback measurements. Such determinations may be semi-static or dynamic.

Figure 3:
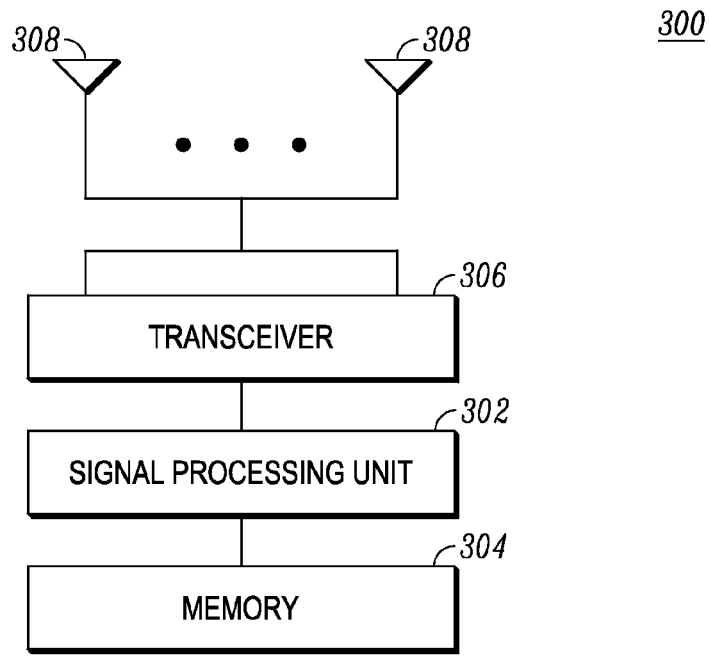
FIG. 3 is a block diagram of a user equipment of the communication system of FIGS. 1 and 2 in accordance with an embodiment of the present invention.
Figure 4:
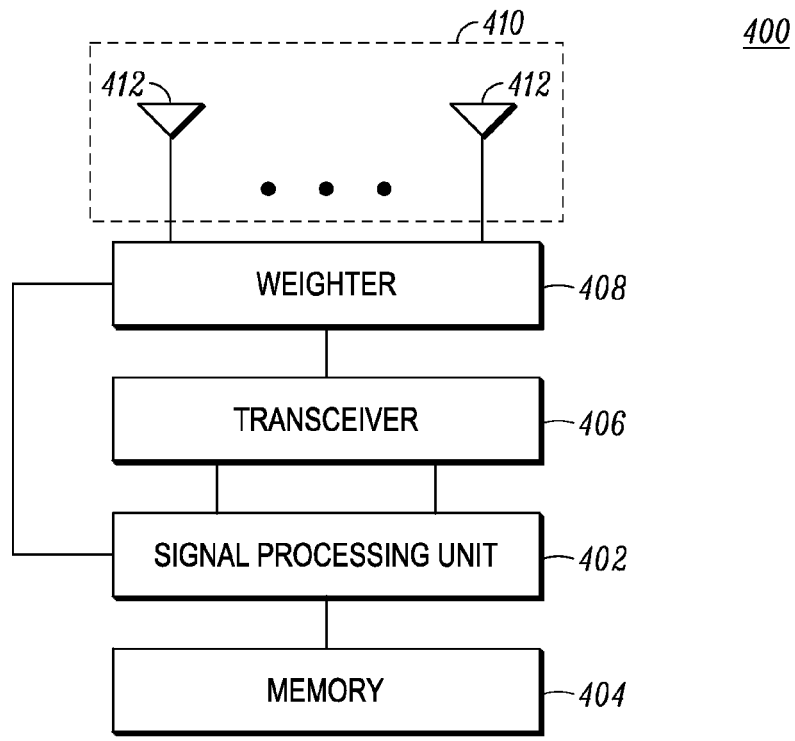
FIG. 4 is a block diagram of a base station of the communication system of FIGS. 1 and 2 in accordance with an embodiment of the present invention.

Referring now to FIGS. 3 and 4, block diagrams are provided of a UE 300, such as UEs 101-103, and a BS 400, such as BSs 110-113 and 200, in accordance with various embodiments of the present invention. Each of UE 300 and BS 400 includes a respective processor 302, 402, such as one or more microsignal processing units, microcontrollers, digital signal signal processing units (DSPs), microprocessors, combinations thereof or such other devices known to those having ordinary skill in the art. The particular operations/functions of processors 302 and 402, and respectively thus of UE 300 and BS 400, are determined by an execution of software instructions and routines that are stored in a respective at least one memory device 304, 404 associated with the signal processing unit, such as random access memory (RAM), dynamic random access memory (DRAM), and/or read only memory (ROM) or equivalents thereof, that store data and programs that may be executed by the corresponding processor. Processor 402 also implements any scheduling functions (a scheduler) performed by the BS based on instructions and routines that are stored in the at least one memory device 404 of the BS. Each of at least one memory devices 304, 404 also maintains codebooks, such as PMI codebooks or extended PMI codebooks, lists of power offsets, rank indications, and any other parameters useful for the UE and BS to perform their functions as described herein.

Each of UE 300 and BS 400 further includes a respective one or more radio frequency (RF) transceivers 306, 406 coupled to the processor 302, 402 of the UE or BS and for wirelessly communicating with a BS and UE, respectively, via an intervening air interface. For example, BS 400 may include multiple transceivers, that is, a transceiver at each RRU 202-205. Each transceiver 306, 406 includes receiving circuitry (not shown) and transmitting circuitry (not shown) for receiving and transmitting signals over an air interface, such as air interfaces 120-123 and 222-225. UE 300 includes one or more antennas 308 and, in the event the UE comprises multiple antennas, may support MIMO communications. BS 400 further includes one or more arrays 410 of antennas, for example, BS 400 may include multiple antenna arrays, that is, array at each RRU 202-205, which arrays each are in communication with a corresponding transceiver 306 and which arrays each comprises multiple antennas 412. By utilizing an antenna array to transmit signals to a UE located in a coverage area of the BS, such as a cell or sector serviced by the antenna array, the BS is able to utilize MIMO techniques for the transmission of the signals.

BS 400 further includes a weighter 408 in association with each transceiver of the one or more transceivers 406, such as a precoder or any other type of signal weighter, that is in communication with processor 402 and that is interposed between a corresponding antenna array 410 and a corresponding transceiver 406. In another embodiment of the present invention, weighter 408 may be implemented by processor 402. Weighter 408 weights signals applied to the multiple antennas 412 of a corresponding antenna array 410 based on channel state information (CSI) fed back by a UE, for example, codebook feedback such as a codebook index and a rank index, statistical feedback such as a covariance matrix or any other type of matrix, eignevectors, or channel quality mean and variance, a received signal quality information, a channel frequency response, or any other type of channel feedback known in the art, in order to predistort and beamform the signals for transmission to the UE over the downlink of the intervening air interface.

When weighter 408 comprises a precoder, each of UE 300 and BS 400 may further maintain, in at least one memory devices 304 and 404 and/or in weighter 408, a precoding matrix, which precoding matrix comprises multiple sets of matrices and wherein each set of matrices is associated with a combination of antennas for downlink transmission and with weights applicable to each antenna. Precoding matrices are well-known in the art and will not be described in greater detail. Based on the channel conditions measured by a UE, the UE reports back a precoding metric, preferably a Precoding Matrix Index (PMI), for a group of resource elements (REs) where an RE is a time-frequency resource such as one (1) subcarrier in frequency by one (1) OFDM symbol in time. In determining a precoding metric for a group of REs, the UE computes a set of complex weights based on the measured channel conditions. The set of complex weights can be Eigen Beamforming vectors derived from downlink reference signal measurements. The complex weights are mapped to a set of already defined vectors, that is, to a nearest vector of the set of already defined vectors, to produce a precoding vector. The UE then conveys the index of the precoding vector selected by the UE using an uplink control channel.

The embodiments of the present invention preferably are implemented within UEs 101-103 and BSs 110-113 and 200, and more particularly with or in software programs and instructions stored in the at least one memory devices 304, 404 and executed by processors 302, 402 of the UEs and BSs. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 101-103 and BSs 110-113 and 200. Based on the present disclosure, one skilled in the art will be readily capable of producing and implementing such software and/or hardware without undo experimentation.

Communication system 100 comprises an Orthogonal Frequency Division Multiple Access (OFDMA) modulation scheme for transmitting data over air interface 206, wherein a frequency channel, or bandwidth, is split into multiple physical resource blocks (PRBs) during a given time period. Each physical resource block (PRB) comprises multiple orthogonal frequency sub-carriers over a given number of OFDM symbols, that are the physical layer channels over which traffic and signaling channels are transmitted in a time division multiplex (TDM) or TDM/frequency division multiplex (FDM) fashion. A communication session may be assigned a PRB or a group of PRBs for an exchange of bearer information, thereby permitting multiple users to transmit simultaneously on the different PRBs such that each user's transmission is orthogonal to the other users' transmissions. A PRB also may be assigned to multiple users in which case the users are no longer orthogonal but they can be separated based on spatial signatures of the individual transmit weights.

In addition, communication system 100 preferably operates according to the Third Generation Partnership Project (3GPP) Long Term Evolution-Advanced (LTE-A) standards, which standards specify wireless telecommunications system operating protocols including radio system parameters and call processing procedures, and implements coordinated multipoint transmission (CoMP) and/or joint MIMO transmission from non-colocated (or distributed) antennas. However, those who are of ordinary skill in the art realize that communication system 100 may operate in accordance with any wireless telecommunication standard employing an Orthogonal Frequency Division Multiplexing (OFDM) modulation scheme, such as but not limited to other 3GPP communication systems employing channel estimation and feedback of channel interference measurements, a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE 802.xx standards, for example, the 802.11a/HiperLAN2, 802.11g, or 802.20 standards, or a Worldwide Interoperability for Microwave Access (WiMAX) communication system that operates in accordance with the IEEE (Institute of Electrical and Electronics Engineers) 802.16 standards, including 802.16e and 802.16m.

Among the signals being multiplexed and transmitted to a UE 101-103 from each of multiple coverage areas, such as by the multiple BSs 110-113 and/or by the multiple RRUs 202-205 associated with BS 200, are reference or pilot signals which may be multiplexed with other control information and user data. Pilot signals, and more particularly Channel State Information-Reference Signals (CSI-RSs), are sent from antennas of a serving BS or RRU that may transmit to a UE in order for the UE to determine channel state information (CSI) that is fed back to a serving BS. Additionally, with respect to CoMP transmissions, the UE may need to determine CSI for multiple TPs or multiple BSs as well and the corresponding CSI-RSs are also configured for that UE.

In Releases 8 and 9 of the 3GPP LTE standards, Common or Cell-Specific reference signals (CRS) (or, in Release 10, Channel State Information Reference Signals (CSI-RSs)), corresponding to a set of CRS ports (CSI-RS ports in Release 10), are sent from a BS and are intended for all UEs in a cell served by the BS. CRS may be used for both demodulation and channel feedback measurements at a UE. In Release-10 additional reference signals are defined, namely Channel State Information Reference Signals (CSI-RSs), which primarily are used for channel feedback measurements at the UE. Demodulation is supported by demodulation reference signals (also referred to as UE specific RS, demodulation RS (DMRS), dedicated RS), which typically are sent in the UE's data allocation region.

Figure 5:
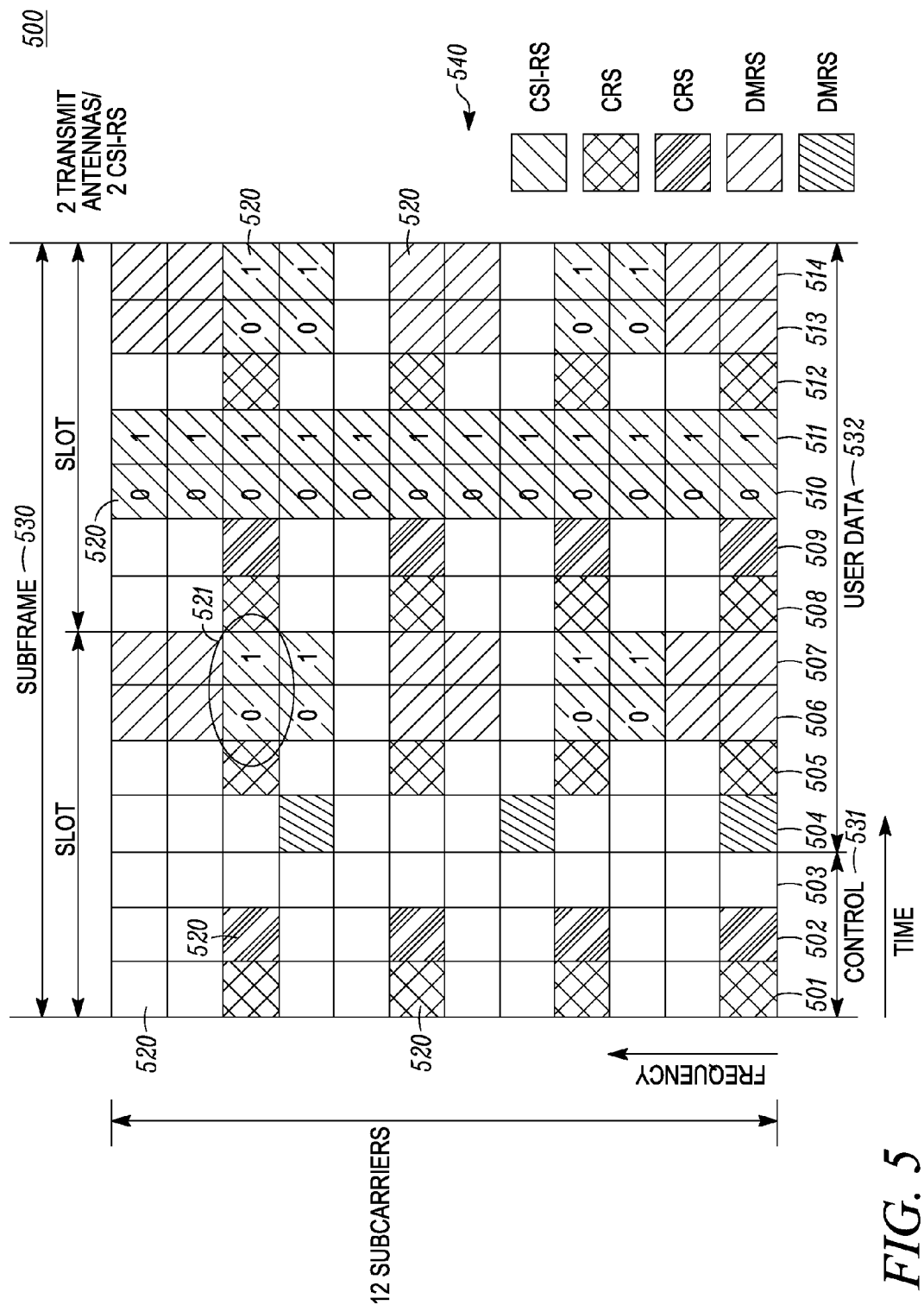
FIG. 5 is an exemplary time-frequency diagram of an OFDMA physical resource block (PRB) employed by the communication system of FIGS. 1 and 2 and that illustrates pilot signal placement within the OFDMA PRB in accordance with an embodiment of the present invention.
Figure 6:
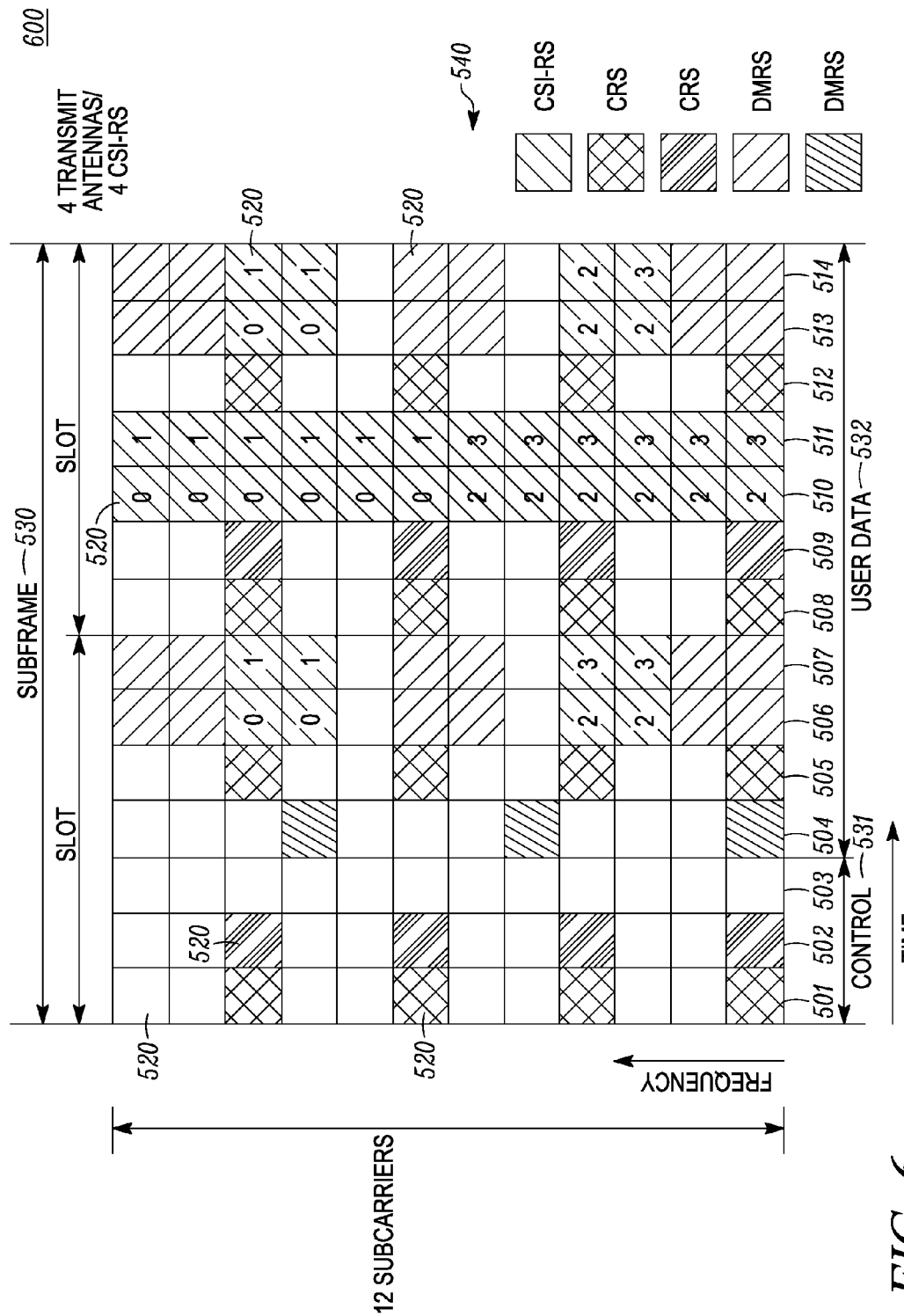
FIG. 6 is an exemplary time-frequency diagram of an OFDMA physical resource block (PRB) employed by the communication system of FIGS. 1 and 2 and that illustrates pilot signal placement within the OFDMA PRB in accordance with another embodiment of the present invention.
Figure 7:
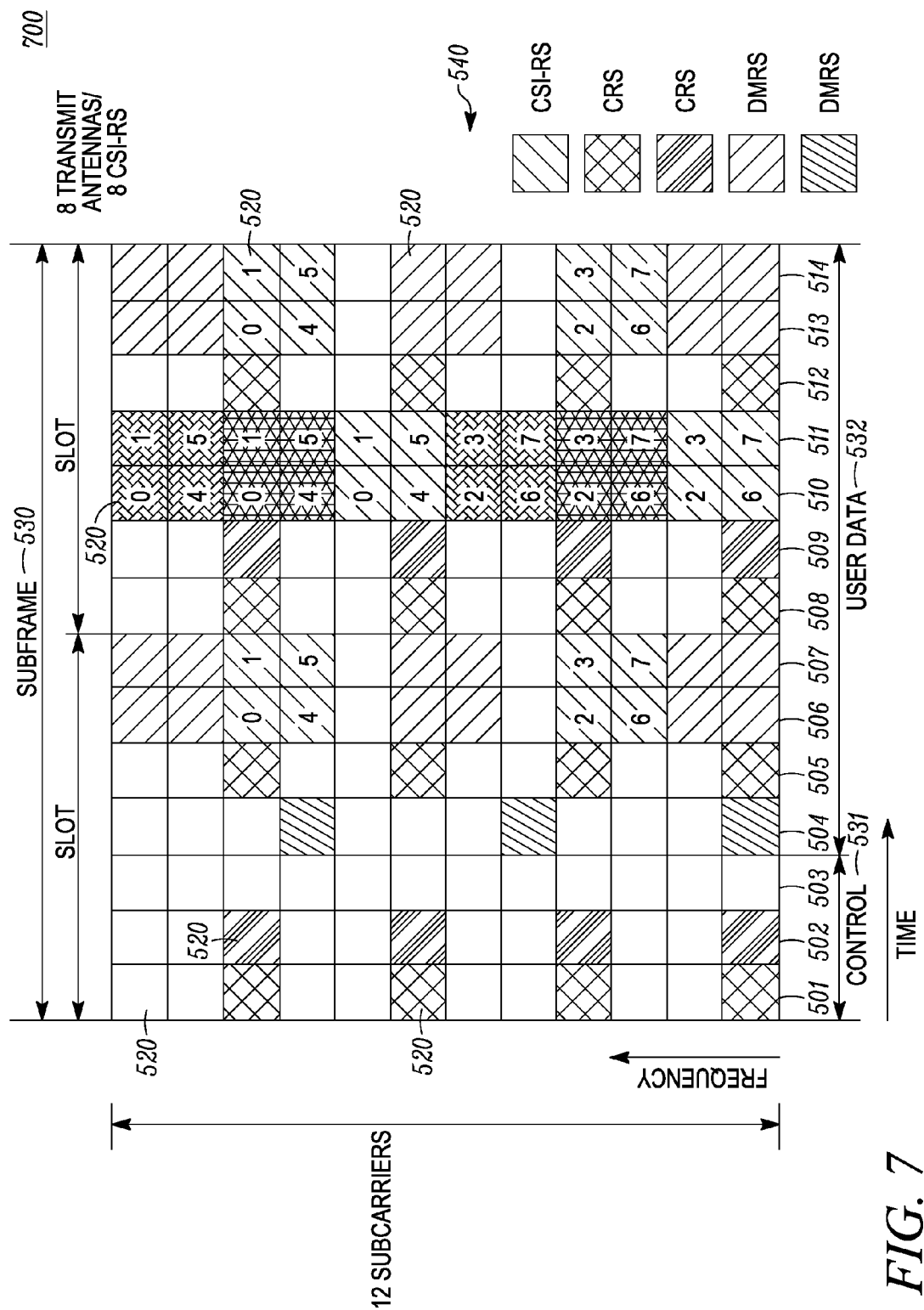
FIG. 7 is an exemplary time-frequency diagram of an OFDMA PRB employed by the communication system of FIGS. 1 and 2 and that illustrates pilot signal placement within the OFDMA PRB in accordance with another embodiment of the present invention.

We will now describe the details of CSI-RS (Channel State Information-Reference Signals) configurations, which essentially are pilot signal used by a BS to set-up channel feedback measurements at a UE. Referring now to FIGS. 5, 6, and 7, time-frequency diagrams 500, 600, 700 respectively are provided that depict exemplary distributions of pilot signals, and particularly CSI-Reference Signals (CSI-RSs), in a OFDMA PRB-pair 540 and over a subframe 530 that may be employed by communication system 100 in accordance with various embodiments of the present invention. The terms 'pilot signals' and 'reference signals' are used interchangeably herein. A vertical scale of each time-frequency diagram 500, 600, 700 depicts multiple blocks of frequency, or frequency bins, (frequency subcarriers) of the subframe that may be allocated. A horizontal scale of each time-frequency diagram 500, 600, 700 depicts multiple blocks of time (in units of OFDM symbols) 501-514 of the subframe that may be allocated. Subframe 530, depicted in time-frequency diagrams 500, 600, and 700, comprises a physical resource block-pair (PRB-pair) 540, wherein the PRB comprises 12 OFDM subcarriers over a time slot comprising seven (7) OFDM symbols. In turn, PRB-pair 540 is divided into multiple resource elements (REs) 520, wherein each RE is a single OFDM subcarrier, or frequency bin, on a single OFDM symbol. Further, PRB-pair 540 may comprise a control region 531, for the transmission of control data, and a user data region 532, for the transmission of user data.

PRB-pair 540 includes multiple potential Channel State Information (CSI) reference signal configurations, which configurations define which resource elements (REs) of the PRB are allocated to the CSI Reference Signals (CSI-RSs). A CSI reference signal configuration is used to refer to a set of resources (REs in an OFDM system) that may be used to transmit a set of CSI-RSs corresponding to a group of one or more transmit antennas. An exemplary operation is described based on the Release 10 specification of LTE. In the current Release 10 version of the 3GPP LTE specification, for a given number (or group) of transmit (BS) antenna ports, multiple CSI reference signal configurations are defined, and a BS may chose one of the available configurations. As used herein, references to transmit antenna ports are intended to refer to BS antenna ports used to transmit signals on a downlink. For example, and referring now to FIG. 5, exemplary CSI reference signal configurations are depicted with groupings of two transmit antenna ports. Each pair of ports [0, 1], are multiplexed with time domain CDM (Code Division Multiplexing). Such a pair [0, 1] corresponds to two antenna ports (for example, '0' and '1') that share the two corresponding reference elements (REs) 521 with a simple CDM code of [1, 1] and [1, −1]. As seen in FIG. 5, any of the potentially 20 CSI reference signal configurations (each indicated by a pair of resource elements labeled (0,1), for example, pair 521) can be configured for measurements on two antenna ports at a UE. PRB-pair 540 also includes non-CSI-RS pilot signals that are distributed in control region 531 and/or user data region 532 of the PRB-pair. For example, the shaded REs of PRB-pair 540 are reserved for, that is, allocated to, other reference symbols, either a common reference signal (CRS) or a dedicated reference signal (DRS). These other reference signals may be present but are not necessarily used for channel estimation or interference measurements by a UE in an LTE-A communication system.

The CSI-RS configurations depicted in FIGS. 5, 6, and 7 are naturally valid for BSs with 2, 4, or 8 transmit antenna ports respectively. For example, FIG. 6 depicts exemplary CSI-RS configurations with groupings of four transmit antenna ports. That is, in FIG. 6, two CDM pairs of REs (0,1) and (2,3) (not necessarily adjacent to each other) are mapped by a single CSI-RS configuration (a redefined set of configurations are used for four transmit antenna ports) and corresponds to four antenna ports. By way of another example, FIG. 7 depicts an exemplary CSI-RS configuration with groupings of eight transmit antenna ports. That is, in FIG. 7, four CDM pairs of REs (0,1), (2,3), (4,5), and (6,7) (not necessarily adjacent to each other) are mapped by a single CSI-RS configuration corresponding to eight antenna ports. As depicted in FIGS. 5, 6, and 7, in setting up CSI-RS reference signals for a UE corresponding to two, four and eight antenna ports, one of 20, 10, and 5 available configurations, respectively, can be used. The information of one or more CSI-RS configurations corresponding to a particular BS or a particular transmission point or multiple BS or multiple transmission points is typically conveyed by higher-layer signaling. As depicted in FIGS. 5, 6, and 7, CSI-RS corresponding to an antenna port is allocated to a resource element (RE) pair in user data region 532, and more particularly to one of the RE pairs associated with OFDM symbols 506-507, 510-511, and 513-514. As also depicted in FIGS. 5, 6, and 7, one antenna may transmit CSI-RS over any of the possible 20 RE pairs corresponding to 20 CSI reference signal configurations. Typically, in a single cell transmission, only up to four CSI-RS RE pairs, and thus a total of 8 REs, are needed to support up to a maximum of eight transmit antennas.

Figure 8:
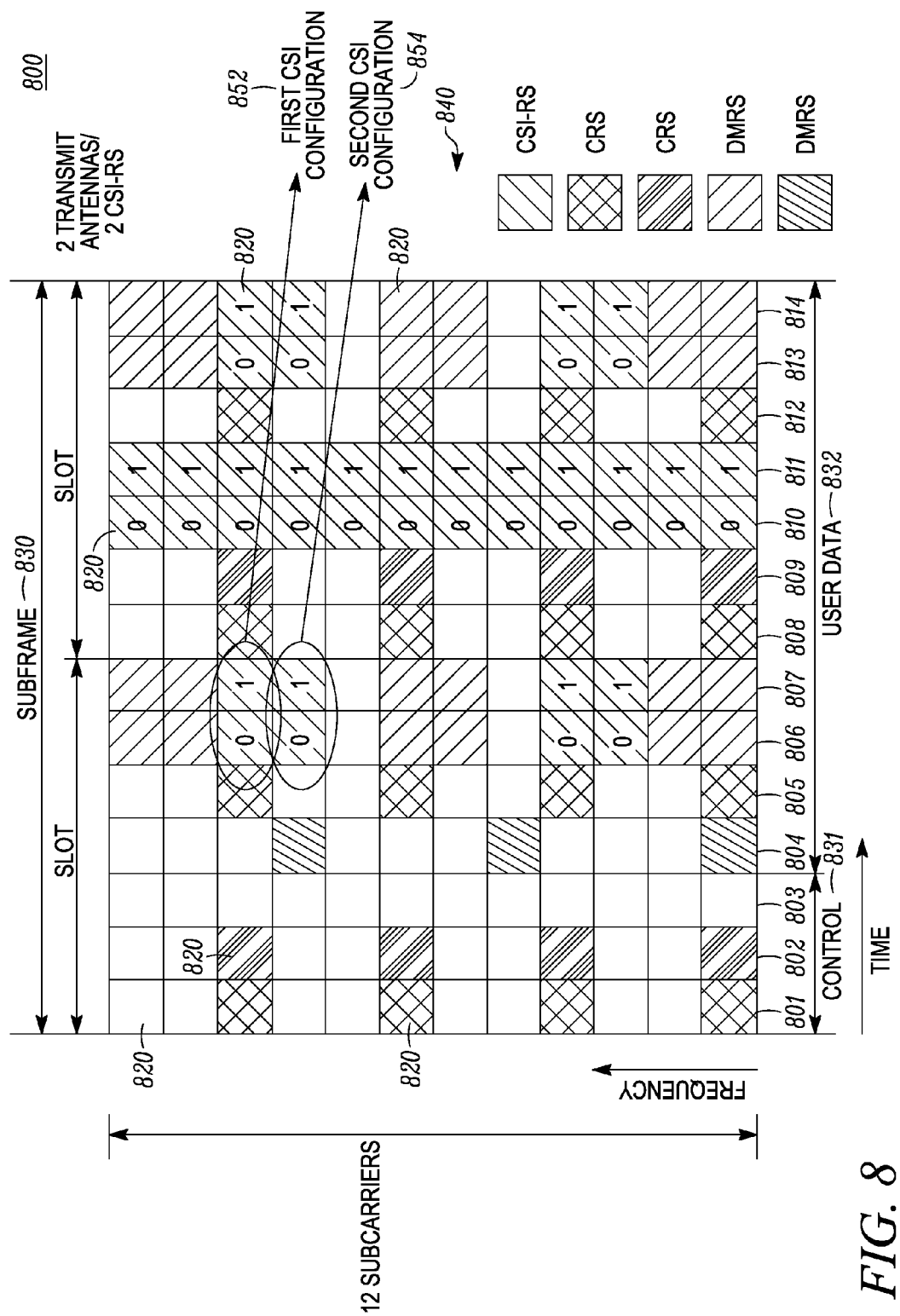
FIG. 8 is an exemplary configuration of CSI-RS, specifically configuration of two CSI-RS reference signal configurations corresponding to two transmission points (TPs).

FIGS. 5-7 depicted CSI-RS configurations that may be set-up for measurements related to single TP MIMO transmissions. One of the possible CSI-RS configurations may be set up by the base station for a UE. To support CoMP or joint MIMO transmissions to a UE, measurements corresponding to multiple TPs needs to be enabled at the UE to support multi-cell feedback. To accomplish this, a base-station can set up multiple CSI-RS reference signal configurations to the UE, each such configuration potentially corresponding to a TP (which could be a set of co-located antennas). An example is shown in FIG. 8, where two CSI-RS configurations are setup corresponding to two different TPs each with two transmit antennas. These configurations are labeled as a first CSI reference signal configuration 852 corresponding to a first TP with two transmit antennas and a second CSI-RS configuration corresponding to a second TP 854 with two transmit antennas.

More generally, two or more TPs, and corresponding antenna ports, which are connected to one or more BSs may cooperatively transmit to a UE. In joint transmission (JT), a set of transmit antenna ports jointly serving a UE, typically TPs or RRUs associated with a same central base station controller or a BS, may jointly transmit data and reference symbols (RSs), such as CSI-RSs, intended for the UE.

For reference, the single TP based MIMO transmission will be described first. The transmission can be represented by the following signal model $$Y = HV \begin{bmatrix} s_1 \\ s_2 \\ \vdots \\ s_r \end{bmatrix} + \eta$$

where H is the channel matrix from the transmit antennas at a transmission point (TP) to the receive antennas at the UE and $\eta$ is the vector with each element being additive white Gaussian noise (AWGN) with variance $\sigma^2$, that is, $\eta_i$ is the noise included in the signal $y_i$ received at the $i^{th}$ UE antenna. A UE measures channel H based on the CSI-RS reference signal configuration for that particular TP. As such the measured channel, usually denoted as Ĥ is not exactly equal to actual channel H due to errors in measurement, For convenience, we do not make this distinction here, and when a channel is referred, it should be understood to refer to the measured channel at the UE. Further a UE derives various hypothetical transmission parameters based on such channel measurements on CSI-RS. Such transmission parameters are parameters that are recommended to be applied at the base-unit for supporting transmissions to the UE.

In the single TP transmission, transmission parameters PMI V and rank r and corresponding CQI are obtained assuming transmission from single TP (TP1) only. In the context as used herein, the transmission parameters, rank and CQI are obtained regardless of whether the transmission is from a single TP or not. "Assuming" is understood to mean that the system operates such that the conditions are met regardless if those conditions have been met. The corresponding channel quality index (CQI) which represents the modulation and coding scheme on each codeword may correspond to that of single or two code-words as further described below.

In current specification of Release-10, the number of codewords transmitted is based on the number of layers (rank) and a single codeword (CW) is transmitted for rank (RI) 1, and two codewords are transmitted for RI>1. In case of two codeword transmission, each codeword is encoded on one or more of the r spatial streams, and the second codeword is encoded on the remaining streams. Correspondingly, if UE reports RI=1, it reports only the CQI corresponding to single codeword, while for rank>1, it reports two CQIs, one for each codeword. These methods are well-known and defined in the Release-10 specification of LTE.

Figure 9:
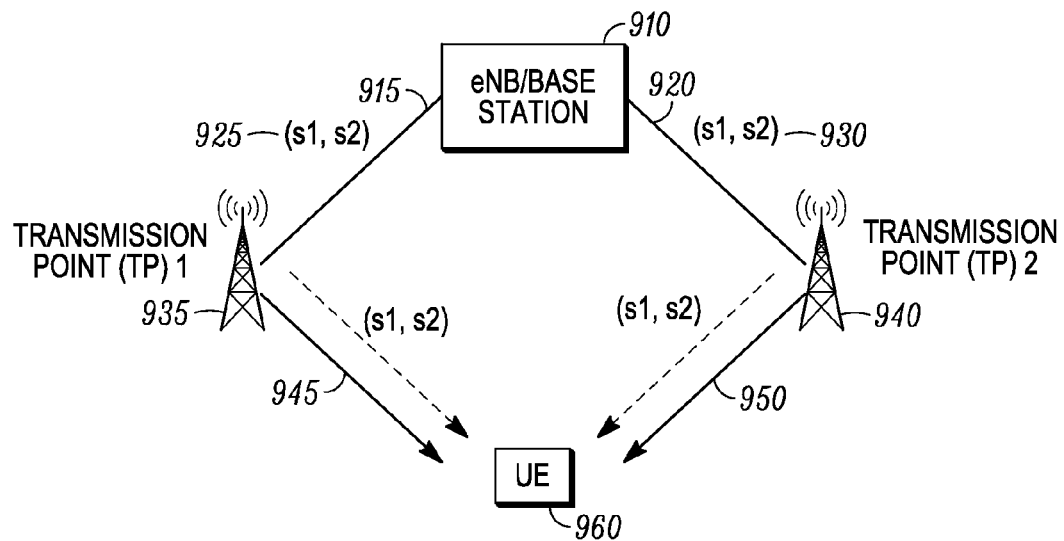
FIG. 9 is an exemplary diagram of coherent joint transmission from two transmission points (TPs) to a wireless terminal.

FIG. 9 illustrates an example of coherent joint transmission from two TPs to a user, which is relevant to some of the embodiments presented here. Two transmission points TP1 935 and TP2 940 are controlled by a base station 910. The base station sends two independent spatial layers (s1, s2) 925 (or 930) over the respective fiber links 915,920 to each of the TPs 935 and 940. The TPs in turn each transmit both the spatial layers (s1,s2) over the air wirelessly to the UE after applying precoding at each TP. A spatial layer is usually associated with a corresponding modulation symbol transmitted simultaneously (along with others associated with other layers) on a single resource unit (as an example a single resource is a single RE as defined previously for MIMO OFDM systems). Many such resource units may be allocated as part of the transmission. In general a much larger set of spatial layers say (s1, s2, s3, . . . sr) may also be transmitted from both of the TPs in a joint rank r transmission described mathematically below.

We now describe the mathematical model for such system. Representing the channel from TP1 to UE1 as H1 and the channel from TP2 to UE1 as H2. the overall signal model is given by $$Y = [H_1 \ H_2] V_{agg} \begin{bmatrix} s_1 \\ s_2 \\ \vdots \\ s_r \end{bmatrix} + \eta$$

-continued $$= [H_1 \ H_2] \begin{bmatrix} V_{agg,1} \\ V_{agg,2} \end{bmatrix} \begin{bmatrix} s_1 \\ s_2 \\ \vdots \\ s_r \end{bmatrix} + \eta$$

which represents a joint MIMO transmission of rank-r from aggregated set of antennas, with an overall precoder $V_{agg}$ of dimension $2N_t \times r$ where $N_t$ is number of antennas per TP. With the joint transmission, UE may have to determine joint PMI $V_{agg}$, joint rank r (r=2 in the above figure), and joint CQI. The PMIs applied at the individual RPs are $V_{agg,1}$ and $V_{agg,2}$ which are essentially the sub-matrices of the joint PMI $V_{agg}$. After determining the $V_{agg}$ for the overall joint transmission, the base station directs the TPs to apply the individual precoders at each node on the set of r data streams.

For the special case of single stream (rank r=1) transmission, the signal model is given as follows $$Y = [H_1 \ H_2] \begin{bmatrix} V_{agg,1} \\ V_{agg,2} \end{bmatrix} s_1 + \eta$$

$$= H_1 v_{agg,1} s_1 + H_2 v_{agg,2} s_1 + \eta$$

The above equation helps understand the terminology of "coherent" joint transmission associated with the approach. Since the same stream is transmitted from both TPs, the equivalent channels $H_1 v_{agg,1} s_1$ and $H_2 v_{agg,2} s_2$ must be in phase, i.e, add coherently. If they add incoherently, the signal stream is severely attenuated (extreme case being phase $(H_1 v_{agg,1} s_1) = -\text{phase}(H_2 v_{agg,2} s_2)$, where signals are subtracted). To avoid this, the aggregate PMI $V_{agg}$ must be jointly determined to allow proper co-phasing (coherent phasing).

In addition, in a system which supports joint transmissions, eNB must have flexibility to fall back to single TP transmission, since it may not always have a TP available to coordinate transmissions and it may not be efficient at the system level to do so. This requires that the JP feedback should include the associated feedback information of single TP as well. The overhead as expressed in feedback instances for two-TP Joint Transmission (JT) is captured below. We point out here that the per TP PMIs V1 and V2 derived assuming per-TP independent transmissions may not satisfy V1=$V_{agg,1}$ and V2=$V_{agg,2}$, and the associated CQIs and RIs are not necessarily related. So the overall CSI overhead may be tripled associated to feedback both JT CSI and the single TP CSIs as captured below.

| Feedback Parameter | RI | PMI | CQI |
|---|---|---|---|
| Number of Feedback Instances | 3 | 3 (2 per TP PMIs and one joint PMI) | 3 (maximum of 6 CW CQIs) |

We will now describe another mechanism that can be enabled by simply feeding back the CSI corresponding to each TP, which would require only two instances of feedback in the above example. Such feedback allows base station to switch transmissions dynamically and chose the best TP between two TPs at a given time considering other network costs. Such schemes are referred to as dynamic point selection (DPS) schemes. Clearly, the three instances of feedback in the above example would effectively support both JT and DPS in a dynamic fashion allowing flexible operation at the network, but at the cost of increasing CSI by three-fold. As described previously JT and DPS together may be referred to as joint processing (JP) schemes.

In various embodiments presented here, we consider several simplifications to reduce the overhead, while simultaneously introducing some limitations onto the corresponding JP support at the eNB.

Coherent JT with per TP PMIs and Cophasing

It would be possible to save some feedback overhead, if the joint PMI for JT can be constructed based on the per TP PMIs. This can be achieved by introducing following structure into the JT-MIMO signal model (with $V_{agg,1}=V1$ and $V_{agg,2}=\alpha V2$)

$$Y = [H_1 \ H_2] \begin{bmatrix} V_1 \\ \alpha V_2 \end{bmatrix} \begin{bmatrix} s_1 \\ s_2 \\ \vdots \\ s_r \end{bmatrix} + \eta$$

where the per-TP PMIs V1,V2 of the same rank r (achieved for joint transmission) are used to construct the overall PMI $V_{agg}=[V1; \alpha V_2]^T$ along with a co-phasing factor $\alpha$. However, the ranks determined assuming single TP transmissions respectively from TP1 and TP2 r1 and r2 respectively, may not be equal to rank r of the joint transmission. Methods are needed to relate the rank r of the joint transmission to that of the single TP transmission.

Rank Definition for JP with per TP PMI

In several embodiments, we will describe how the rank of the joint transmission must be related to that of the individual transmissions. In some embodiments, the rank of JT may be constrained to be a function of the rank of the individual TPs.

In one embodiment, r'=max(r1, r2). This would be a preferred option in some cases. But if one of the ranks, say that of TP1 r1<max(r1, r2), then the feedback corresponding to TP1 would be based on assuming a higher rank than it can support optimally (if only a single TP transmission from TP1 were assumed).

In another embodiment, r'=min(r1, r2), which is a straightforward definition, and can be used to improve the performance of transmission with JT. However not much spatial multiplexing gain can be obtained as rank and hence the rate is limited to that of the minimum of the supported ranks.

In another embodiment the rank may be obtained as a sum of the ranks r'=r1+r2 or more generally as r'=min(r1+r2, rmax), where rmax may be the maximum supported rank which could be configured by the basestation and/or may be related (equal) to the number of receive antennas at the UE.

In a more general embodiment, a pre-defined relationship of JT rank to per TP ranks may be based on number of transmit antennas and number of receive antennas at the UE (or maximum rank support). The performance can be determined in advance and a table (of JT ranks) can be defined as given by the following examples, which could be further optimized.

|  | r2 = 1 | r2 = 2 |
| --- | --- | --- |
| (Nt = 2, rmax = 2) r1\r2 | | |
| r1 = 1 | 2 | 2 |
| r1 = 2 | 2 | 2 |
| (Nt = 2, rmax = 4) r1\r2 | | |
| r1 = 1 | 2 | 2 |
| r1 = 2 | 2 | 4 |

Note that once JT rank is determined to allow $[V_1; \alpha V_2]^T$ type hierarchical structure in precoding where the rank of the per TP PMIs are same as that of the JT rank (due to stacking of PMIs), we need to set-up r1'=r2'=r' and then the per TP and joint feedbacks must be based on this restriction on rank relationships i.e. r'=r1'=r2' to use the PMI structure. Note that JT without such hierarchical structure, where JT-PMI is decided independently does not need such explicit relationship (hence would require three RI reports r,r1,r2). The overhead reduction from full-blown JP feedback described before may be captured as below.

| Feedback Parameter | RI | PMI | CQI |
| --- | --- | --- | --- |
| Number of Feedback Instances | 1 | 2 per TP PMIs + co-phasing α | 3 (maximum of 6 CW CQIs) |

In one embodiment, the above relationship/mapping of per-TP ranks to the JT rank can be signaled by the eNB semi-statically or individual rank restriction or codebook subset restriction can be further used to setup the constraints.

In another embodiment, the rank triplet (r,r1,r2) may be mapped to a rank such that r'=r1'=r2'=f(r,r1,r2), where such a functional relationship may be pre-defined or partially or wholly indicated by the base-station explicitly.

However, there are certain shortcomings to the above approach. Firstly, the rank is not optimized for all the modes and could degrade performance. Secondly, the CQI overhead is not reduced. Per-TP CQI corresponding to each TP and a JT CQI needs to be fedback. Of course it is possible to skip feedback of JT-CQI, and rely on coarse prediction at eNB, but it could be highly inaccurate, since the MIMO channel with coherent JT is different and the receiver behavior would be difficult to predict, thereby losing most of the gains.

Figure 11:
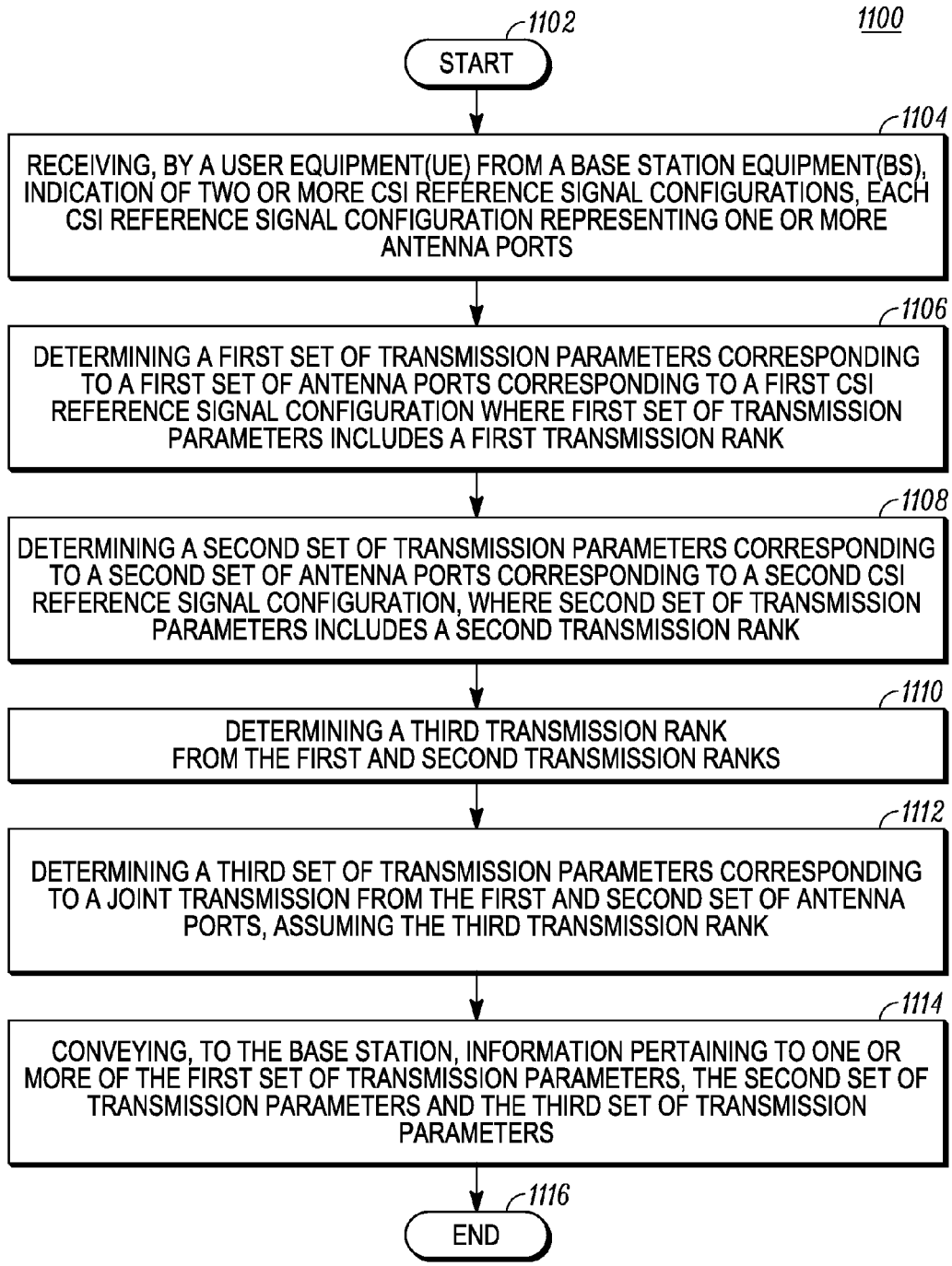
FIG. 11-14 are logical flow diagrams that illustrate methods in a wireless terminal for supporting co-ordinated multipoint transmissions in a communication system of FIGS. 1 and 2 in accordance with various embodiments of the present invention.

Referring now to FIG. 11, a logical flow diagram is depicted illustrating the method of rank determination for joint processing (JP) in a wireless terminal communicating with a base station according with various embodiments of the invention. The method comprises receiving (1104) indication of two or more CSI reference signal configurations, each CSI reference signal configuration representing one or more antenna ports comprising a set of antenna ports, determining (1106) a first set of transmission parameters corresponding to a first set of antenna ports corresponding to a first CSI reference signal configuration where first set of transmission parameters includes a first transmission rank, determining (1108) a second set of transmission parameters corresponding to a second set of antenna ports corresponding to a second CSI reference signal configuration, where second set of transmission parameters includes a second transmission rank, deriving a third transmission rank (1110) from the first and second transmission ranks, determining (1112) a third set of transmission parameters corresponding to a joint transmission from the first and second set of antenna ports, assuming the third transmission rank and conveying (1114), to the base station, information pertaining to one or more of the first set of transmission parameters, the second set of transmission parameters and the third set of transmission parameters.

JT Feedback with Per TP PMI and Per TP CQI

Figure 10:
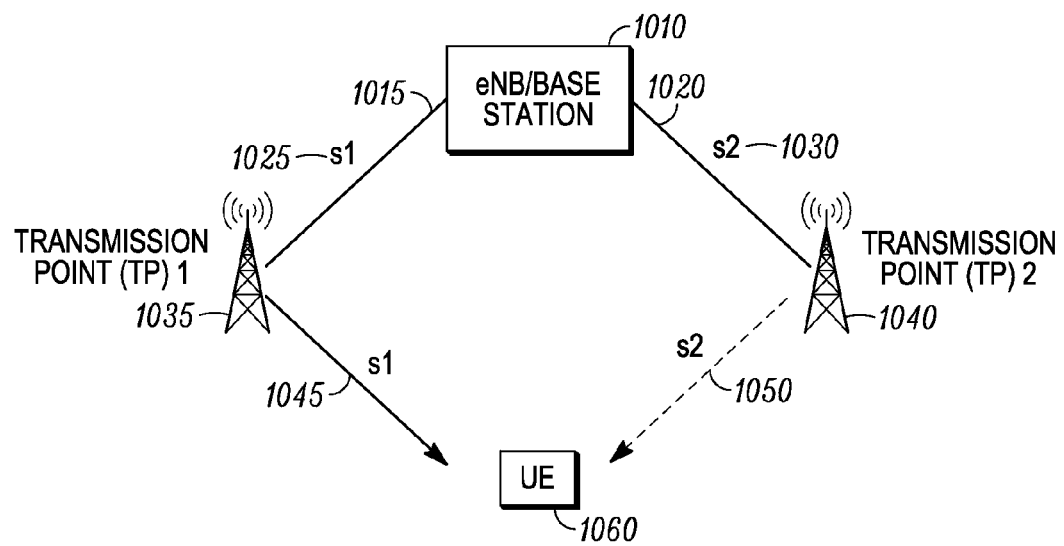
FIG. 10 is an exemplary diagram of non-coherent joint transmission from two transmission points (TPs) to a wireless terminal.

We will describe several embodiments to further reduce the feedback overhead with JP. We will first describe the approach of non-coherent joint transmission as illustrated in FIG. 10. FIG. 10 illustrates an example of coherent joint transmission from two TPs to a user, which is relevant to some of the embodiments presented here. Two transmission points TP1 1035 and TP2 1040 are controlled by a base station 1010.

The base station sends two spatial layers s1 (1025) and s2 (1030) over the respective fiber links 1015, 1020 to each of the TPs 1035 and 1040 respectively. The first TP, TP1 (1035), transmits first spatial layer s1 after applying precoding V1 and second TP transmits second spatial layer s2 after applying precoding V2. More generally, each TP may transmit one or more spatial layers, in which case s1 and s2 could each correspond to a set of spatial layers as further described below.

Mathematically, a non-coherent JP scheme may be defined as follows, $$Y = [H_1 \ H_2] \begin{bmatrix} V_1 & 0 \\ 0 & V_2 \end{bmatrix} \begin{bmatrix} \vec{s}_1 \\ \vec{s}_2 \end{bmatrix} + \eta$$

$$= H_1 V_1 \vec{s}_1 + H_2 V_2 \vec{s}_2 + \eta$$

We must note that the aggregate PMI is a diagonal matrix of individual PMIs, with no cross-terms. Hence the transmission is not sensitive to the phase of individual transmissions.

Further, FIG. 10 shows typical non-coherent JP operation, where individual spatial layers are sent from each TP. If the codeword mapping as in Release-10 is applied to the existing system for each TP, up to 2 codewords may need to be transmitted (if r1>1 and r2>1, where r1,r2 are ranks of $V_1$ and $V_2$) on each TP. In such a case, the CQI also needs to allow CQI for two codewords associated with each TP, which is not desirable.

In one preferred embodiment, only a single codeword transmission is always assumed on each TP regardless of number of spatial layers on that TP and a single codeword CQI needs to be feedback associated with each TP along with corresponding PMI and rank index RI.

In one embodiment, the precoder pair (V1, V2) (or corresponding diagonal matrix V=diag($V_1, V_2$) and the rank pairs (r1,r2) and CQI pairs (CQI1 for CW1 from TP1, CQI2 for CW2 from TP2) are determined assuming simultaneous joint transmission of single CW from each of the TPs. In such a case receiver assumes the channel knowledge of both $H_1$ and $H_2$ from the respective TPs for computing each individual PMI/CQI/RI. This could be compared with legacy per-TP feedback which is based on channel (say $H_1$ for TP1 CSI) for that particular TP only.

Figure 12:
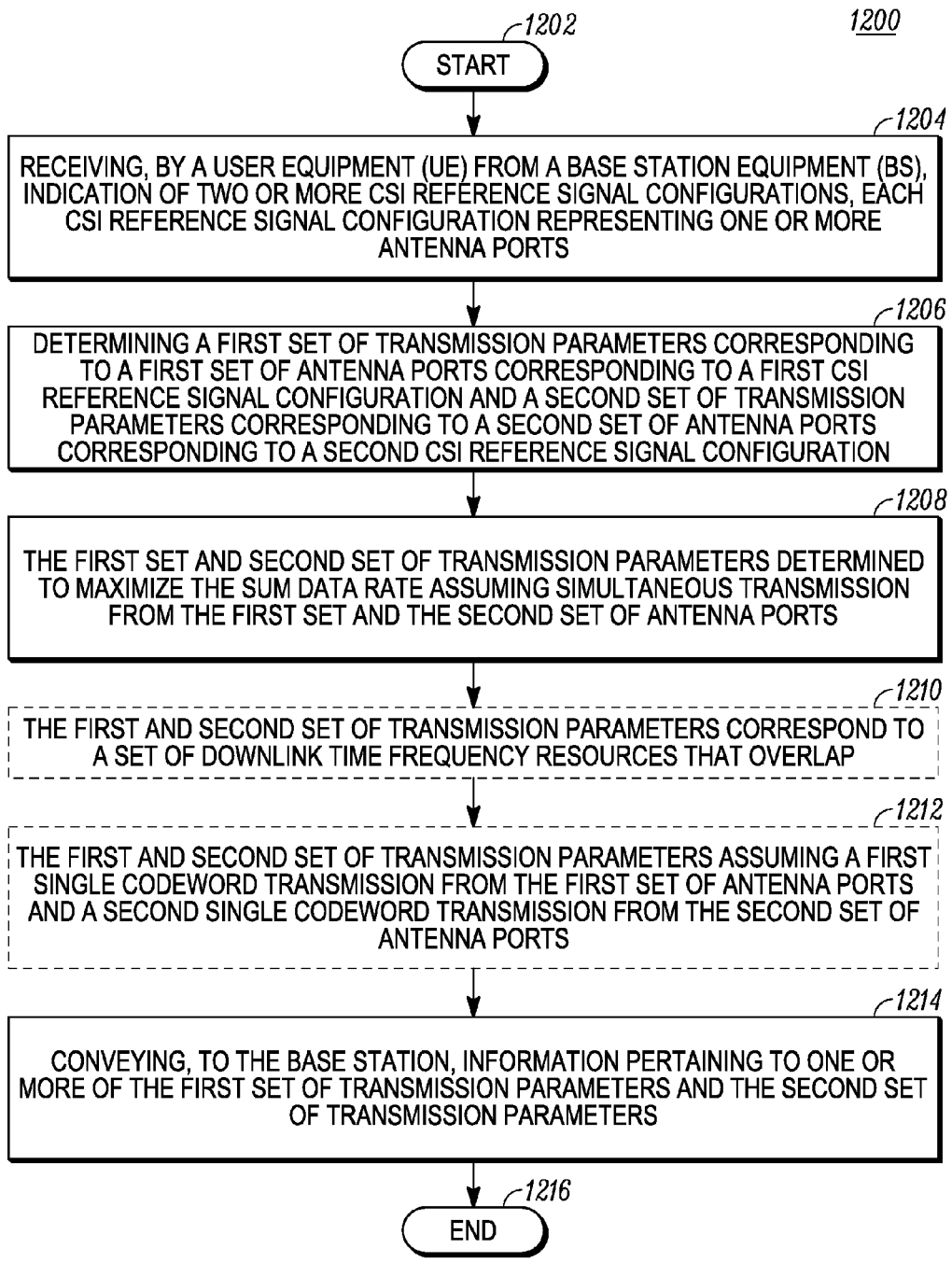

Referring now to FIG. 12, a logical flow diagram is depicted illustrating the method of supporting feedback for joint processing (JP) in a wireless terminal communicating with a base station according with various embodiments of the invention. The method comprises receiving (1204) indication of two or more CSI reference signal configurations, each CSI reference signal configuration representing one or more antenna ports comprising a set of antenna ports; determining (1206) a first set of transmission parameters corresponding to a first set of antenna ports corresponding to a first CSI reference signal configuration and a second set of transmission parameters corresponding to a second set of antenna ports corresponding to a second CSI reference signal configuration, where the first set and second set of transmission parameters are determined (1208) to maximize the sum data rate assuming simultaneous transmission from the first set and the second set of antenna ports and conveying (1214), to the base station, information pertaining to the first set of transmission parameters and the second set of transmission parameters. In another embodiment of the invention (1210), the first and second set of transmission parameters correspond to a set of downlink time frequency resources overlap. In another embodiment of the invention (1212), the first and second set of transmission parameters assuming a first single codeword transmission from the first set of antenna ports and a second single codeword transmission from the second set of antenna ports Referring now to FIG. 15, a logical flow diagram is depicted illustrating the method of joint processing (JP) in a wireless base-station communicating with a wireless terminal according with various embodiments of the invention. The method comprises sending (1504) indication of two or more CSI reference signal configurations, each CSI reference signal configuration representing one or more antenna ports comprising a set of antenna ports; receiving (1506) information pertaining to the first set of transmission parameters corresponding to a first set of antenna ports corresponding to a first CSI reference signal configuration and a second set of transmission parameters corresponding to a second set of antenna ports corresponding to a second CSI reference signal configuration; the first set and second set of transmission parameters determined assuming a simultaneous first single codeword transmission from the first set of antenna ports on a first downlink time frequency resource and a second single codeword transmission from the second set of antenna ports on a second downlink time frequency resource where the first and second time frequency resources overlap (1508). In another embodiment, the base station transmitting (1510) a first codeword from the first set of antenna ports and a second codeword from the second set of antenna ports based on the information pertaining to the first and the second set of antenna ports.

Separate Encoding of PMI for Non-Coherent JP

We will now describe some preferred embodiments for separate encoding of PMI pair (V1,V2) with the example of two transmit antennas at each TP and with non-coherent JT transmission.

In one embodiment, this would require two-bit overhead to report both the ranks (1 bit/rank as RI takes values 1 or 2). Individual PMIs only require 2 bits/PMI (maximum 4 possible values in Release-10 specification for 2Tx codebook), which for two TP joint transmissions would be four bits per each subband, where each subband is single instance of a set of bands on which feedback must be reported. Feedback may have to be reported on one or more sub-bands. CQI corresponding to the two CWs (one per TP) is also reported, and the maximum overhead is similar to existing CQI overhead (with maximum support for two CWs). Further with separate encoding, JT rank is simply the sum of both the ranks and need not be separately signaled.

In one embodiment, the per TP ranks can also be jointly encoded for feedback even in this case, since maximum rank (rmax) with JT could be limited due to NRx (number of receive antennas) at the UE, or when optimized for that maximum rank support.

In one example, as shown below 3 bits are required for rank indication with rmax=4. No report is required for rmax=2 with coherent JT transmission, since only rank pair (1,1) is supported in such a case.

| (RI1, RI2) for NRx/rmax = 4 |
| --- |
| 1, 1 |
| 1, 2 |
| 2, 1 |
| 2, 2 |
| 1, 3 |
| 3, 1 |

For rmax=2, one exemplary encoding of rank could be as follows including dynamic point selection (DPS) as a special case with a zero rank transmission on one of the TPs with muting or no transmission from other transmission point.

| Joint Rank and DPS Encoding (RI1, RI2) for NRx/rmax = 2 |
| --- |
| 1, 1 |
| 1, 0 |
| 0, 1 |

Entry (1,0) would correspond to assumption of no transmission from the second TP. Similar encoding can also be used for rmax=4 case as shown below.

| Joint Rank and DPS Encoding (RI1, RI2) for NRx/rmax = 4 (4bits) |
| --- |
| 1, 1 |
| 1, 2 |
| 2, 1 |
| 2, 2 |
| 1, 3 |
| 3, 1 |
| 1, 0 |
| 0, 1 |
| 2, 0 |
| 0, 2 |
| 3, 0 |
| 0, 3 |
| 4, 0 |
| 0, 4 |

In one embodiment, we could replace or add to (r, 0) type entries with (r,x) entries which represents that second TP is transmitting/active but not transmitting to that user. In one embodiment, the UE may be required to assume non-precoded interference on the other TP (sum received power from all transmit antennas without precoding). In another embodiment, the UE may assume that other TP is transmitting using transmit diversity mode. Such transmit mode could correspond to well-defined Alamouti type space-time or space-frequency transmission mode.

In another embodiment, if other TP is assumed to transmit as well for CQI computation purpose, certain precoding assumption may be used corresponding to other TP for deriving interference. Multiple options are possible for the assumption of interfering precoder. In other words, to derive CQI1 and PMI V1 and rank r1 for TP1, an assumption may be defined for TP2 precoder (say V2') for purpose of interference calculation. In one embodiment, the interference may be based on a random precoder from the codebook. In yet another embodiment, the interference may be based on a fixed precoder or a fixed precoder relationship to the selected per-TP precoder i.e if V1 is used for precoding on TP1 for CSI of TP1, then a simultaneous transmission using a fixed precoder V2'=Vc or a fixed function V2'=Vc(V1) may be used to derive precoder assumption and corresponding interference from TP2. More generally, such fixed precoders may be dependent on the subband index. Further the interfering precoder V2' may have to be chosen be such the CQI1 minimized or maximized (best or worst case CQI).

The overhead is captured below applying the various embodiments described here, where rank and mode (JT+DPS) are jointly encoded in one report, single PMI pair is reported, and a maximum of two CQIs are reported.

| Feedback | RI+(Mode) | PMI | CQI |
| --- | --- | --- | --- |
| Number of Feedback Instances | 1 (Jointly Encoded) | 1 | 1 (max of 2CW CQIs) |

Joint CODEBOOK Encoding of Per-TP PMIs and RI (Including DPS/Coherent JP Entries)

In various embodiments described above, several simplifications are made to reduce overhead. Further in the description, we will consider feedback encoding to support some joint encodings and support for hybrid operations allowing both coherent and non-coherent modes. In one embodiment, as opposed to feedback for exclusively non-coherent encoding described earlier, we could also consider an enhanced codebook to jointly encode both rank (RI), non-coherent JT PMI pairs and possibly DPS PMIs and coherent JT based PMIs together, which will be described in detail below.

In one embodiment, joint encoding can be supported between per TP PMIs and the ranks. As an example for 2Tx/TP case, 4 codebook entries are supported for rank 1 PMI and 3 codebook entries for rank 2 PMI, as copied below.

| Release-10 2Tx Codebook | | |
| --- | --- | --- |
| Codebook | Number of layers $\upsilon$ | |
| index | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

The joint encodings are captured below, where each entry captures the two ranks (r1,r2) as row and column, and the one of the applicable PMI pairs in the corresponding table row and column.

| Joint Encoding Entries per Rank Pair rmax = 4 | | |
| --- | --- | --- |
| Total: 49 | 1 | 2 |
| 1 | 16 (=4 × 4) | 12 (=4 × 3) |
| 2 | 12 (=4 × 3) | 9 (=3 × 3) |

With rmax=4, 49 entries are required (16+12+12+9) to capture (V1,V2, r1, r2), which requires 6 bits of feedback. Otherwise for rmax=2, only 16 entries are needed, which is a corner case of separate encoding.

| Joint Encoding Entries per Rank Pair with rmax = 2 | | |
| --- | --- | --- |
| Total: 16 | 1 | 2 |
| 1 | 16 | 0 |
| 2 | 0 | 0 |

In one embodiment, DPS is combined in the above joint encodings of rank+PMI, where a zero rank is treated as no transmission or transmission to other user. An additional 14 entries can be used to capture DPS (rank=0) as captured below for the rmax=4 and rmax=2 cases, bringing total entries to 63 and 30.

| Joint Encoding Entries per Rank Pair with DPS and rmax = 4 | | | |
|---|---|---|---|
| Total Entries: 63 | 0 | 1 | 2 |
| 0 | 0 | 4 | 3 |
| 1 | 4 | 16 | 12 |
| 2 | 3 | 12 | 9 |

| Joint Encoding Entries per Rank Pair with DPS and rmax = 2 | | | |
|---|---|---|---|
| Total Entries: 30 | 0 | 1 | 2 |
| 0 | 0 | 4 | 3 |
| 1 | 4 | 16 | 0 |
| 2 | 3 | 0 | 0 |

The encodings in the above embodiment also capture the dynamic selection as part of the PMI (as rank 0 for one of the TPs). The total number of codebook entries in Table 10 is 63 if maximum JT rank is 4, which can be efficiently supported with 6 bits (up to 64 entries with 6 bit representation). For ramx=2, we only need 30 entries, which can be supported with 5 bits.

In one embodiment, two codeword support may be assumed for RI>1 (as in Rel-10 with single TP transmissions) only for DPS entries ((r,0) or (0,r)) with transmission from only one TP.

In another embodiment, we consider supporting coherent joint transmission as well in addition to the non-coherent PMI (with DPS as a special case) described above. Recall that the non-coherent JT PMIs are essentially diagonal, where the block diagonals are essentially the per-TP PMIs (diag(V1, V2)).

We can note that for 2Rx case the UE can support a maximum rank of 2, in which case the overhead is significantly decreased allowing supporting both diagonal entries, DPS entries and non-diagonal entries simultaneously. In the example above with rmax=2, 30 entries were needed for supporting non-coherent JT (and DPS).

In one embodiment, additional non-diagonal codebook entries of the form $[V1; \alpha V2]^T$ can be added to the diagonal PMIs, where V1/V2 are each of equal rank. For rank 1, supporting two values (+1,−1) for $\alpha$ would require about 4×4×2=32 entries (4 entries for rank 1 PMI for 2Tx transmission), leaving only 2 (64−30−32) for rank 2. In one embodiment, a fixed codebook entry may be used for rank 2 (e.g., codebook index 1) with (+1,−1) for $\alpha$, which brings the total to 34 entries for both rank 1 and rank 2 included.

In another embodiment, instead of using the per-TP codebook entries corresponding to the 2Tx codebook, codebook entries corresponding to aggregated 4Tx may be used. 4Tx codebook in Release-10 supports 16 entries for each rank, which will yield 16+16=32 entries for supporting rank 1 and rank 2.

In the above examples, if the non-diagonal codebook entries are used, a maximum of two codeword transmission may be assumed, and codeword to spatial layer mapping can be used as currently defined (i.e two code-words for joint rank of the coherent joint PMI, r>1 and single codeword for r=1). This way the CQI overhead is limited to a maximum of two CW CQIs regardless of the joint codebook entry chosen. The overall codebook is summarized below.

| Joint Encoding of Ranks, PMIs and JP Mode | |
|---|---|
| Codebook Entries | CQIs |
| Non-coherent PMI Pair (V1, V2) corresponding to JT diagonal PMI, $diag(V1, V2) = \begin{bmatrix} V_1 & 0 \\ 0 & V_2 \end{bmatrix}$ | CQI1 for CW1 sent from TP1 corresponding to PMI V1; CQI2 for CW2 sent from TP2 corresponding to PMI V2; |
| DPS PMIs Single PMI V1 or V2 (for no transmission or transmission to other user) | Single codeword for RI = 1 and two codewords for RI > 1, where RI is rank of V1 or V2 |
| Coherent JT PMI of the form $[V1; \alpha V2]^T$ where V1, V2, $\alpha$ use separate encoding or an aggregate precoder codebook for Vagg | Single codeword for RI = 1 and two codewords for RI > 1, where RI is rank of the combined precoder ($[V1 \; \alpha V2]^T$ or Vagg) |

In one embodiment, a base unit may indicate its preference for certain codebook entries or modes (say preference for DPS vs coherent JT vs non-coherent JT) by signaling a codebook-subset-restriction, where such encoding is essentially a bit string equal to length of the codebook, with a 1 or 0 indicating whether the corresponding codebook entry is allowed for selection in feedback at the UE. When computing CQI for DPS codebook entries, as previously described in detail, one of multiple options can be used for capturing interference of the other TP (no transmission, random PMI, fixed PMIs)

The described embodiments can be extended easily for other cases with larger number of transmit antennas or different number of transmit antennas per TP. We briefly describe the extension to 4Tx/TP scenario.

In one embodiment with separate encoding of RI and PMIs, would result in increase in PMI overhead over Release-10 baseline with 8 bits for two PMIs (4 per 4Tx PMI) and two rank reports of 2 bits (1<=RI<=4) each. This would support both rmax=2/4 scenarios.

In another embodiment, joint encoding of rank pair can again be used to support DPS as well.

| (RI1, RI2) for NRx = 4 |
|---|
| 1, 1 |
| 1, 2 |
| 2, 1 |
| 2, 2 |
| 1, 3 |
| 3, 1 |
| 1, 0 |
| 0, 1 |
| 2, 0 |
| 0, 2 |
| 3, 0 |
| 0, 3 |
| 4, 0 |
| 0, 4 |

Unlike 2Tx, we see smaller benefit to supporting coherent JP in this case, so no joint encoding (non-diagonal) entries may be needed.

Figure 13:
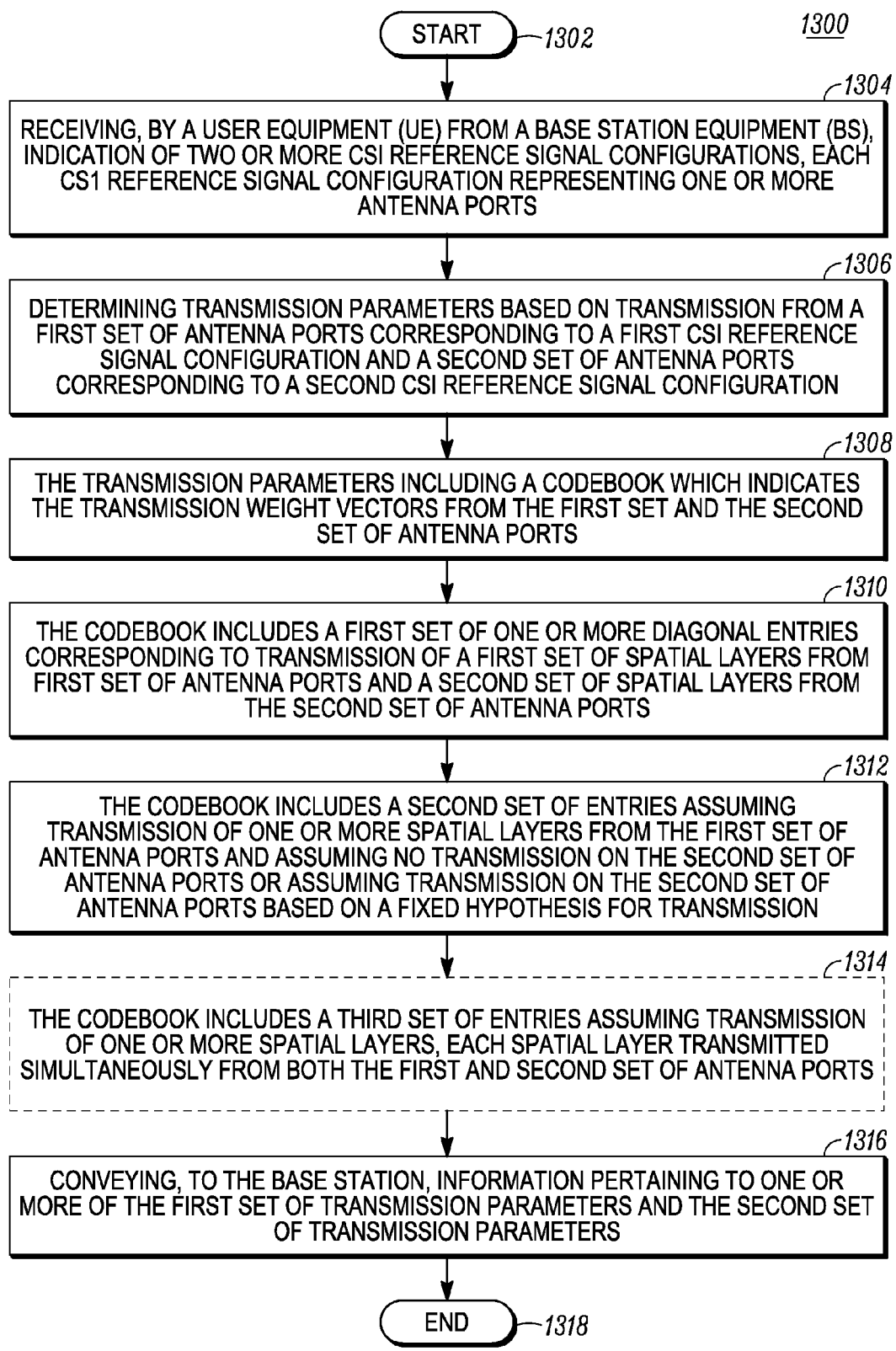

Referring now to FIG. 13, a method in a wireless communication terminal is described in accordance with various embodiments described above. The method comprises receiving (1304) indication of two or more CSI reference signal configurations, each CSI reference signal configuration representing one or more antenna ports comprising a set of antenna ports; determining (1306) transmission parameters based on transmission from a first set of antenna ports corresponding to a first CSI reference signal configuration and a second set of antenna ports corresponding to a second CSI reference signal configuration; the transmission parameters including a codebook (1308) which indicates the transmission weight vectors from the first set and the second set of antenna ports and number of spatial layers from the first and second set of antenna ports; the codebook includes a first set of one or more diagonal entries (1310) corresponding to transmission of a first set of spatial layers from the first set of antenna ports and a second set of spatial layers from the second set of antenna ports; the codebook includes a second set of entries (1312) assuming transmission of one or more spatial layers from the first set of antenna ports and assuming no transmission on the second set of antenna ports or assuming transmission on the second set of antenna ports based on a fixed hypothesis for transmission; conveying (1316) back the preferred codebook index to the base station. In another embodiment, the codebook includes a third set of entries (1314) assuming transmission of one or more spatial layers, each spatial layer transmitted simultaneously from both the first and second set of antenna ports.

Figure 16:
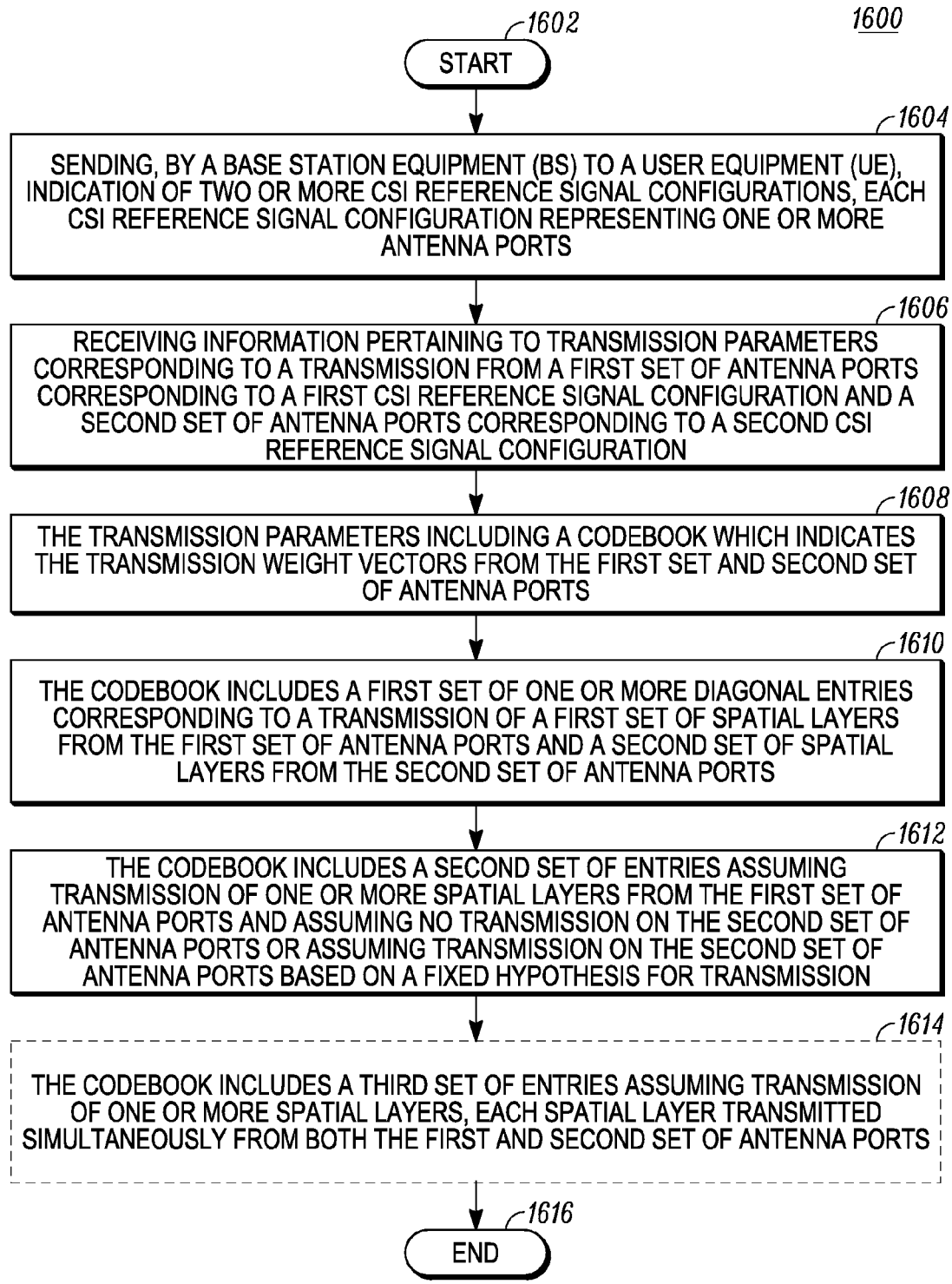

Referring now to FIG. 16, a method in a wireless communication base station is described in accordance with various embodiments of the present invention. The method comprises sending (1604) indication of two or more CSI reference signal configurations, each CSI reference signal configuration representing one or more antenna ports comprising a set of antenna ports; receiving (1606) information pertaining to transmission parameters corresponding to a transmission from one more of a first set of antenna ports corresponding to a first CSI reference signal configuration and a second set of antenna ports corresponding to a second CSI reference signal configuration; the transmission parameters including a codebook (1608) which indicates the transmission weight vectors from the first set and second set of antenna ports; the codebook includes a first set of one or more diagonal entries (1610) corresponding to transmission of a first set of spatial layers from the first set of antenna ports and a second set of spatial layers from the second set of antenna ports; the codebook includes a second set of entries (1612) assuming transmission of one or more spatial layers from the first set of antenna ports and assuming no transmission on the second set of antenna ports or assuming transmission on the second set of antenna ports based on a fixed hypothesis for transmission. In another embodiment, the codebook includes a third set of entries (1614) assuming transmission of one or more spatial layers, each spatial layer transmitted simultaneously from both the first and second set of antenna ports Configuration of Feedback Modes In various embodiments so far, feedback is defined assuming transmission on a given frequency resource of set of bands associated with a subband. In general, the embodiments are applicable as they are to whole bandwidth (wideband or WB) feedback or by simply repeating over each subband for multiple subband (SB) feedback. Most of the feedback modes supported in LTE can be extended for JP with concepts outlined before, assuming a single codeword transmission from each TP.

We describe some preferred embodiments applicable to most modes (except mode "UE Selected Mode" 2-2 described later).

Option 1: Non-coherent JP with 1CW from each TP

In one embodiment, using developed encodings for non-coherent JT with 1CW from each TP as described, the feedback content is described below.

| Non-coherent JP with 1CW from each TP | |
|---|---|
| Wideband Report of CSI (CQI/PMI/RI) | (WB PMI 1 for TP1, WB PMI2 for TP2) and (WB CQI for CW 1 from TP1, WB CQI for CW 2 from TP2) WB RI1 for TP1, WB RI2 for TP2 |
| Subband Report of CSI (CQI/PMI/RI) | (SB PMI 1 for TP1, SB PMI2 for TP2) and (SB CQI for CW 1 from TP1, SB CQI for CW 1 from TP2) RI not reported for SB |

Option 2: Non-coherent JP+DPS Dynamic Switching

In one embodiment, using developed encodings for non-coherent JT including DPS with 1CW from each TP as described, the feedback content is described below. In this case, a joint rank encoding and DPS encoding (enhanced RI abbreviated as eRI) is indicated as a wideband report (example for 4Tx copied below).

| Joint Rank and DPS Encoding with rmax = 4 (4bits) (RI1, RI2) for rmax = 4 |
|---|
| 1, 1 |
| 1, 2 |
| 2, 1 |
| 2, 2 |
| 1, 3 |
| 3, 1 |
| 1, 0 |
| 0, 1 |
| 2, 0 |
| 0, 2 |
| 3, 0 |
| 0. 3 |
| 4, 0 |
| 0, 4 |

The other wideband and subband reports are conditioned on this report as captured below.

| Non-coherent JP + DPS Dynamic Switching | |
|---|---|
| Wideband Report of CSI (CQI/PMI/RI) | 1) eRI report as captured by joint encoding table above<br>2) If JP indicated by eRI –><br>(WE PMI 1 for TP1, WB PMI2 for TP2) and (WB CQI for CW 1 from TP1, WB CQI for CW 2 from TP2)<br>If DPS on TP 't' indicated by eRI –><br>(WB PMI for TP t) and<br>(WB CQI for one or two CWs from TP t assuming other TP is muted)<br>Notes:<br>i) For DPS from single TP, codeword to layer mapping as in Rel-10 can be assumed (1CW for RI = 1 and 2CW for RI > 1)<br>ii) The CQI with DPS may also be computed by assuming transmit diversity on other TP or assuming fixed precoder cycling instead of muting |
| Subband Report of CSI (CQI/PMI/RI) | Same as above except for subband (No eRI per subband) |

UE Selected Feedback Modes

Mode 2-2 in Release-10 supports UE selected subband feedback, where a UE selects a set of M preferred sub-bands for feedback and a single PMI/CQI is feedback for all the M selected subbands. A wideband PMI/CQI/RI is also reported. The advantage of this mode is that frequency selective gains are obtained while reducing overhead, since subband feedback is not reported from each of the subbands in the whole bandwidth. The feedback is only doubled over wideband feedback one corresponding to wideband and one corresponding to the M selected subbands. Extending this to JP feedback as described earlier for same resource, is little different from other modes due to the selected subband aspects, which will be discussed further.

Option 1: Non Coherent JP with 1 CW per TP with same M Selected Subbands

In one embodiment, we look at feedback supporting non-coherent JT with 1 CW per TP constraining selection of the M selected sub-bands to be the same for both the TPs.

| Non Coherent JP with 1 CW per TP with same M selected subbands | |
| --- | --- |
| Wideband Report (WB CSI) | (WB PMI 1 for TP1, WB PMI2 for TP2) and (WB CQI for CW 1 from TP1, WB CQI for CW 2 from TP2) |
| "M Selected Subbands" Report (mCSI) (single report for M Selected subbands) | (mPMI 1 for TP1, mPMI2 for TP2) and (mCQI for CW 1 from TP1, mCQI for CW 2 from TP2) |

This particular embodiment is same as non-coherent JT support for other modes, as the resource is completely overlapping and chosen based on joint CQI maximization with JT. The drawback is that if the base station wants to fall back on a single TP, then the frequency selective gains are lost, since a combined metric is optimized.

To overcome this limitation, an another embodiment is described in which different sets of sub-bands are selected based on optimizing per TP CQIs as below.

Option 2: Non Coherent JP with 1 CW per TP with Different M Selected Subbands

| Non Coherent JP with 1 CW per TP with different M selected subbands and CQI on each TP assuming wideband PMI on other TP | |
| --- | --- |
| WB CSI Report | (WB PMI 1 for TP1, WB PMI2 for TP2) and (WB CQI for CW 1 from TP1, WB CQI for CW 2 from TP2) |
| "M Selected Subbands" Report (mCSI) (single report for M Selected subbands) | For TP 1, Select M subbands, where the selection is based on per TP CQIs on each subband computed assuming interference based on WB PMI2 for TP2 (from step 1) Report M subbands Index 1, mPMI 1, mCQI 1 of CW1 from TP1 For TP2, Select M subbands, where the selection is based on per TP CQIs on each subband computed assuming WB PMI1 for TP1 (from step 1) Report M subbands Index 2, mPMI 2, mCQI 2 of CW1 |

In the above embodiment UE first determines the wideband report for per-TP CSI1, and for selecting the M subbands, may compute channel quality metrics on each subband assuming that other TP is using its corresponding wideband precoder. This allows flexible scheduling at base station. If base-station performs DPS on a subband, it can select the best subband for a TP based on above M selected sub-bands index corresponding to that TP, and obtain PMI and CQI for that TP from mPMI/mCQI report. Further joint transmission can also be supported using mPMIs for one TP and wideband PMIs for other TP.

In a variation of the above embodiment, the M subbands are selected for each TP assuming other TP is not transmitting.

| Non Coherent JP with 1 CW per TP with different M selected subbands and CQI on each TP for no transmission on other TP | |
| --- | --- |
| Replace WB PMI, WB CQI with | For TP 1, WB PMI 1, WB CQI 1 of CW1 from TP1 assuming other TP is not transmitting. For TP2, WB PMI 2, WB CQI 2 of CW1 from TP2 assuming other TP is not transmitting. |
| Replace mPMI, mCQI with | For TP 1, Select M subbands, where the selection is based on per TP CQI computed assuming other TP is not transmitting Report M subbands Index 1, mPMI 1, mCQI 1 of CW1 from TP1.. For TP2, Select M subbands, where the selection is based on per TP CQI computed assuming other TP is not transmitting. Report M subbands Index 2, mPMI 2, mCQI 2 of CW1 for TP2 |

In other embodiments, further variations can again be considered where instead of no transmission, one can assume transmit diversity (open loop transmission) or fixed precoder relationships for other TP.

Figure 14:
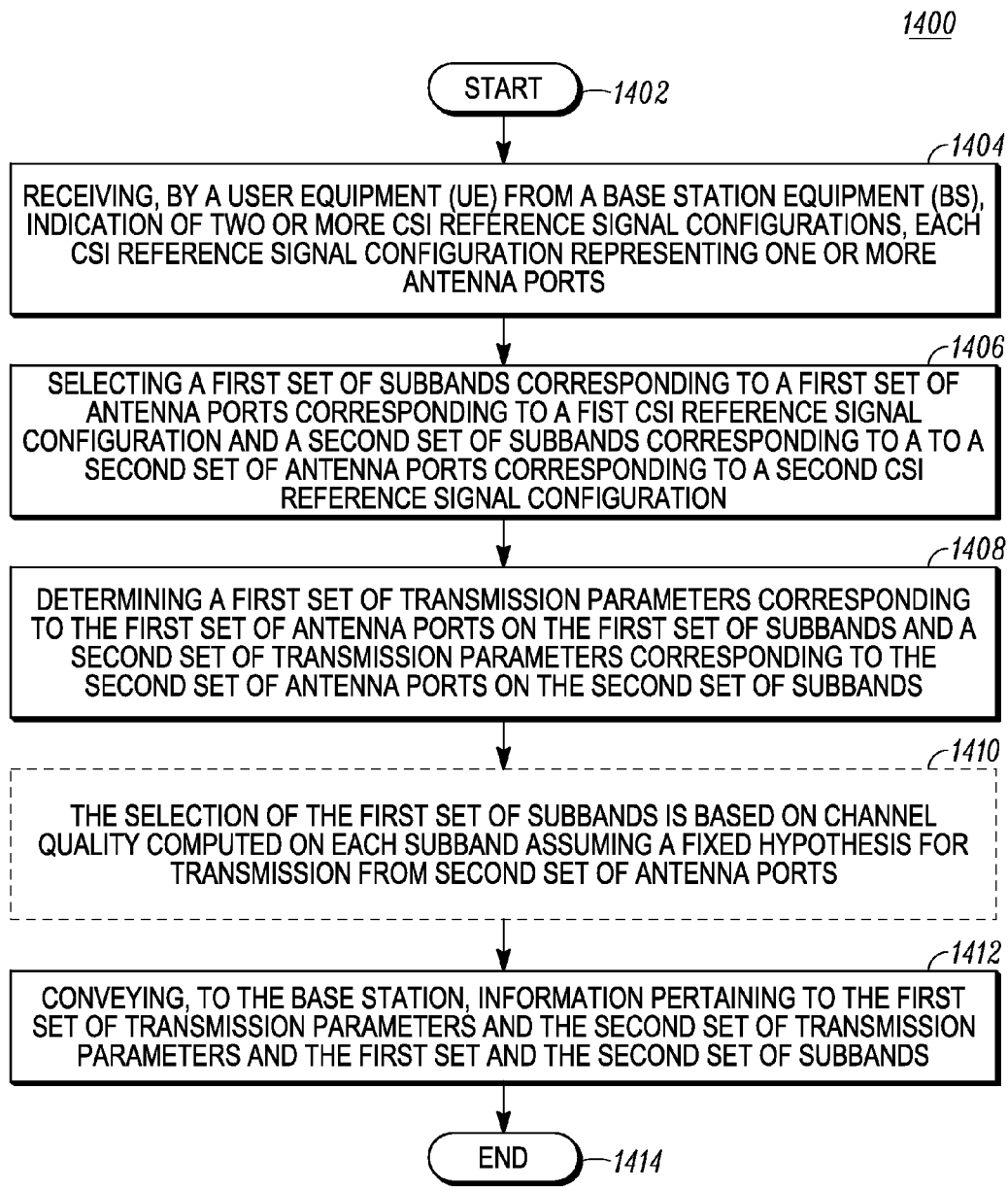
Figure 15:
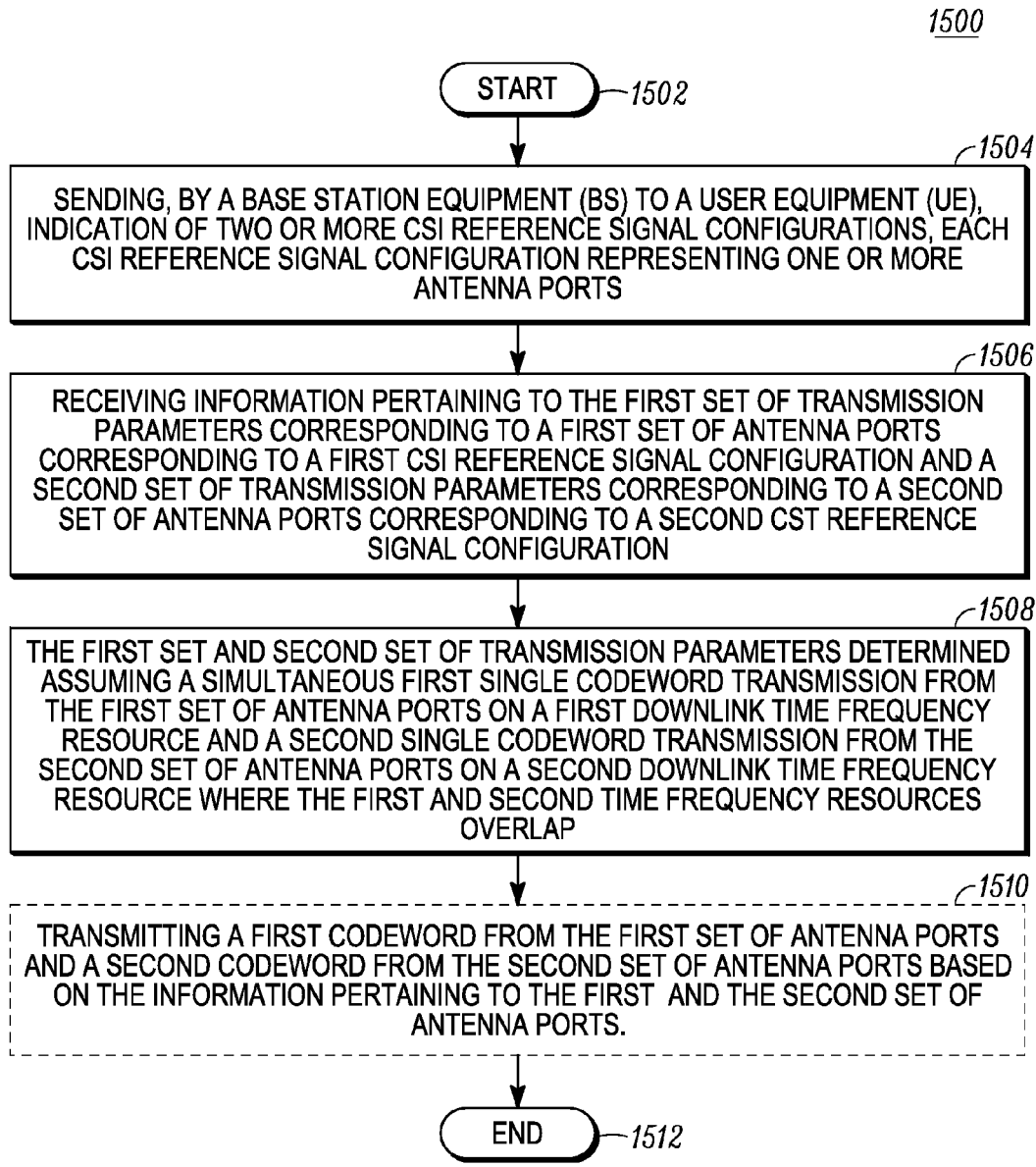
FIG. 15-16 are logic flow diagrams that illustrates methods in a wireless base station for supporting co-ordinated multipoint transmissions in a communication system of FIGS. 1 and 2 in accordance with various embodiments of the present invention.

Referring now to FIG. 14, a method in a wireless communication terminal is described in accordance with various embodiments of the present invention. The method comprises receiving (1404) indication of two or more CSI reference signal configurations, each CSI reference signal configuration representing one or more antenna ports comprising a set of antenna ports; selecting (1406) a first set of subbands corresponding to a first set of antenna ports corresponding to a first CSI reference signal configuration and a second set of subbands corresponding to a to a second set of antenna ports corresponding to a second CSI reference signal configuration; determining (1408) a first set of transmission parameters corresponding to the first set of antenna ports on the first set of subbands and a second set of transmission parameters corresponding to the second set of antenna ports on the second set of subbands; conveying (1412) to the base station, information pertaining to the first set of transmission parameters and the second set of transmission parameters and the first set and the second set of subbands. In another embodiment (1410), the selection is based on channel quality computed on each subband for a fixed hypothesis for transmission from second set of antenna ports.

The invention has been presented with exemplary embodiments for supporting joint processing at the base station and the methods to enable scheduling and determination of transmission parameters at the base-station; and the methods to determine channel state information feedback at the wireless communication terminal communicating with a base station unit. Many of the embodiments have used the examples of joint processing from two transmission points. It is straightforward to extend this to more than two transmission points.

In one exemplary embodiment, joint transmission can be performed from more than two transmission points. Coherent or no-coherent or dynamic points selection transmissions can be based on more than two transmission points. A single codeword may be transmitted on each transmission point or a single codeword may be transmitted jointly from more than one transmission point, while different spatial layers of the codeword may be transmitted from different TPs. The joint transmission may be further limited to a maximum codewords transmitted from all transmission points to two codewords.

In another exemplary embodiment, rank determination for JP may be based on the ranks of the individual per-TP transmissions of more than two TPs. The per-TP CQI may be derived for a combination of fixed transmission hypothesis at other TPs of the more than two TPs. A different fixed transmission hypothesis may be used for each TP. As an example, it is possible to assume no transmission on one TP and transmit diversity on another TP and a fixed precoding configuration at yet another TP.

In yet another embodiment, the joint encoding of per-TP ranks and codebook may be performed for more than two TPs as described before for two TPs, which may include a combination of diagonal, non-diagonal codebook entries and entries that correspond to no transmission from one or more TPs.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method in a wireless communication terminal communicating with a base unit comprising:
   receiving indication of two or more Channel State Information (CSI) reference signal configurations, each CSI reference signal configuration representing one or more antenna ports;
   determining a first set of transmission parameters corresponding to a first set of antenna ports corresponding to a first CSI reference signal configuration and a second set of transmission parameters corresponding to a second set of antenna ports corresponding to a second CSI reference signal configuration;
   the first set and second set of transmission parameters determined to maximize the sum data rate assuming simultaneous transmission from the first set and the second set of antenna ports; and
   conveying, to the base station, information pertaining to the first set of transmission parameters and the second set of transmission parameters.

2. The method of claim 1, further comprising
   assuming a first single codeword transmission from the first set of antenna ports and a second single codeword transmission from the second set of antenna ports.

3. The method of claim 2, wherein a channel quality index corresponding to the second codeword is differentially encoded corresponds to that of the first codeword.

4. The method of claim 1, wherein the transmission parameters correspond to one or more of precoding matrix index, rank indicator, channel quality indication.

5. The method of claim 1, wherein the first and second set of transmission parameters correspond to a set of downlink time frequency resources that overlap.

6. The method of claim 1, further wherein the first and second CSI reference signal configurations each span a subset of the time frequency resources that span the downlink system bandwidth where the subsets of the time frequency resources that span the downlink system bandwidth overlap.

7. The method of claim 1, further comprising:
   determining the first set of transmission parameters for use with a fixed hypothesis of one or more transmission parameters on the second set of antenna ports.

8. The method of claim 7, wherein the fixed hypothesis of one or more transmission parameters on the second set of antenna ports correspond to transmission with transmit diversity mode, while the first set of transmission parameters includes a precoding matrix index.

9. The method of claim 7, wherein the fixed hypothesis of transmission parameters on the second set of parameters for a known PMI relationship for each sub band.

10. A method in a wireless terminal comprising:
    receiving indication of two or more CSI reference signal configurations, each CSI reference signal configuration representing one or more antenna ports;

determining a first set of transmission parameters corresponding to a first set of antenna ports corresponding to a first C SI reference signal configuration, where first set of transmission parameters includes a first transmission rank;

determining a second set of transmission parameters corresponding to a second set of antenna ports corresponding to a second CSI reference signal configuration, where second set of transmission parameters includes a second transmission rank;

deriving a third transmission rank from the first and second transmission ranks; and determining a third set of transmission parameters corresponding to a joint transmission from the first and second set of antenna ports, assuming the third transmission rank;

conveying, to the base station, information pertaining to one or more of the first set of transmission parameters, the second set of transmission parameters and the third set of transmission parameters.

11. A method in a wireless communication device comprising:

receiving indication of two or more CSI reference signal configurations, each CSI reference signal configuration representing one or more antenna ports;

determining transmission parameters based on transmission from a first set of antenna ports corresponding to a first CSI reference signal configuration and a second set of antenna ports corresponding to a second CSI reference signal configuration;

wherein the transmission parameters including a code book which indicates the transmission weight vectors from the first set and the second set of antenna ports;

wherein the code book includes a first set of one or more diagonal entries corresponding to transmission of a first set of spatial layers from first set of antenna ports and a second set of spatial layers from the second set of antenna ports; and wherein the code book includes a second set of entries for transmission of the one or more spatial layers from the first set of antenna ports and for the second set of antenna port are not transmitting or transmitting based on a fixed hypothesis for transmission; and conveying back the preferred codebook index to the base station.

12. The method of claim 11, wherein the code book further includes a third set of entries assuming transmission of one or more spatial layers, each spatial layer transmitted simultaneously from both the first and second set of antenna ports.

13. The method of claim 11, wherein the codebook implicitly includes the information of the number of spatial layers transmitted on each set of antenna ports.

14. The method of claim 11, wherein the information of a number of spatial layers transmitted on each set of antenna ports is feedback in one report and a conditional code book index is fedback in another report, where the conditional codebook index is wherein the codebook is based on a code book based on the number of spatial layers.

15. A method in a wireless terminal comprising:

receiving indication of two or more CSI reference signal configurations, each CSI reference signal configuration representing one or more antenna ports;

selecting a first set of sub bands corresponding to a first set of antenna ports corresponding to a first CSI reference signal configuration and a second set of sub bands corresponding to a to a second set of antenna ports corresponding to a second CSI reference signal configuration;

determining, assuming a simultaneous first transmission from the first set of antenna ports and second transmission from the second set of antenna ports, a first set of transmission parameters corresponding to the first set of antenna ports on the first set of sub bands and a second set of transmission parameters corresponding to the second set of antenna ports on the second set of sub bands; and conveying, to the base station, information pertaining to the first set of transmission parameters and the second set of transmission parameters and the first set and the second set of sub bands.

16. The method of claim 15, wherein the determination of a first set of transmission parameters corresponding to a first set of sub bands is based on channel quality computed on each sub band for a fixed hypothesis for transmission from second set of antenna ports.

17. The method of claim 16, where the fixed hypothesis for transmission corresponds to transmission with a wideband precoding matrix index corresponding to the second set of antenna ports.

18. The method of claim 16, where the fixed hypothesis for transmission corresponds to no transmission on second set of antenna ports.

19. The method of claim 16, where the fixed hypothesis for transmission corresponds to transmission with transmit diversity mode on the second set of antenna ports.

20. The method of claim 16, where the fixed hypothesis for transmission corresponds to a fixed precoder relationship based on the sub band.

21. A method in a wireless base station, the method comprising:

sending indication of two or more CSI reference signal configurations, each CSI reference signal configuration representing one or more antenna ports;

receiving information pertaining to the first set of transmission parameters corresponding to a first set of antenna ports corresponding to a first CSI reference signal configuration and a second set of transmission parameters corresponding to a second set of antenna ports corresponding to a second CSI reference signal configuration;

the first set and second set of transmission parameters determined assuming a simultaneous first single codeword transmission from the first set of antenna ports on a first downlink time frequency resource and a second single codeword transmission from the second set of antenna ports on a second downlink time frequency resource where the first and second time frequency resources overlap.

22. The method of claim 21, further comprising:

transmitting a first codeword from the first set of antenna ports and a second codeword from the second set of antenna ports based on the information pertaining to the first and the second set of antenna ports.

23. A method in a wireless base station, the method comprising:

sending an indication of two or more CSI reference signal configurations, each CSI reference signal configuration representing one or more antenna ports;

receiving information pertaining to transmission parameters corresponding to a transmission from a first set of antenna ports corresponding to a first CSI reference signal configuration and a second set of antenna ports corresponding to a second CSI reference signal configuration;

wherein the transmission parameters including a code book which indicates the transmission weight vectors from the first set and second set of antenna ports;

wherein the code book includes a first set of one or more diagonal entries corresponding to transmission of a first set of spatial layers from the first set of antenna ports and a second set of spatial layers from the second set of antenna ports; and the code book includes a second set of entries assuming transmission of one or more spatial layers from the first set of antenna ports and assuming no transmission on the second set of antenna ports or assuming transmission on the second set of antenna ports based on a fixed hypothesis for transmission.

24. The method of claim 23, further comprising,
the codebook further includes a third set of entries assuming transmission of one or more spatial layers, each spatial layer transmitted simultaneously from both the first and second set of antenna ports.

25. A method in a wireless terminal comprising:
receiving indication of two or more Channel State Information (CSI) reference signal configurations, each CSI reference signal configuration representing one or more antenna ports;
determining a first set of transmission parameters corresponding to a first set of antenna ports corresponding to a first C SI reference signal configuration, where first set of transmission parameters includes a first transmission rank;
determining a second set of transmission parameters corresponding to a second set of antenna ports corresponding to a second CSI reference signal configuration, where second set of transmission parameters includes a second transmission rank, the second transmission rank based on the determined first transmission rank;
conveying, to the base station, information pertaining to one or more of the first set of transmission parameters, and the second set of transmission parameters.

26. The method of claim 25, wherein the information pertaining to the transmission parameters correspond to one or more of precoding matrix index, rank indicator, channel quality indication.

27. The method of claim 25, wherein the second transmission rank based on the determined first transmission rank further comprises the second transmission rank is same as the determined first transmission rank.

28. A method in a wireless communication device comprising:
receiving indication of two or more Channel State Information (CSI) reference signal configurations, each CSI reference signal configuration representing one or more antenna ports;
receiving an indication for a first subset of codebook entries from a first codebook based on a first codebook-subset-restriction value, the first subset of codebook entries indicates possible transmission weight vectors corresponding to a first set of antenna ports corresponding to the first CSI reference signal configuration;
receiving an indication for a second subset of codebook entries from a second codebook based on a second codebook-subset-restriction value, the second subset of codebook entries indicates possible transmission weight vectors corresponding to a second set of antenna ports corresponding to the second CSI reference signal configuration;
determining a first set of transmission parameters corresponding to the first set of antenna ports corresponding to the first CSI reference signal configuration, where first set of transmission parameters includes a first precoding matrix index, the first precoding matrix index selected from the first subset of code book entries;
determining a second set of transmission parameters corresponding to the second set of antenna ports corresponding to the second CSI reference signal configuration, where second set of transmission parameters includes a second pre coding matrix index, the second pre coding matrix index selected from the second subset of code book entries;
conveying, to the base station, information pertaining to one or more of the first set of transmission parameters, and the second set of transmission parameters.

29. The method of claim 28, further comprising,
conveying, to the base station, one or more of the determined first precoding matrix index and the determined second precoding matrix index.

30. The method of claim 29, further comprising,
determining a first transmission rank as a member of the first set of transmission parameters,
determining the first precoding matrix index based on the determined first transmission rank,
conveying, to the base station, information pertaining to the first set of transmission parameters comprising the first transmission rank and the first precoding matrix index.

31. The method of claim 30, further comprising,
determining a second transmission rank as a member of the second set of transmission parameters, the second transmission rank based on the determined first transmission rank determining the second precoding matrix index based on the determined second transmission rank,
conveying, to the base station, information pertaining to the second set of transmission parameters comprising the second transmission rank and the second precoding matrix index.

32. The method of claim 31, wherein the second transmission rank based on the determined first transmission rank further comprises the second transmission rank is same as the determined first transmission rank.

* * * * *

UNITED STATES PATENT AND TRADEMARK OFFICE
CERTIFICATE OF CORRECTION

PATENT NO. : 8,953,699 B2
APPLICATION NO. : 13/669710
DATED : February 10, 2015
INVENTOR(S) : Krishna K. Sayana et al.

It is certified that error appears in the above-identified patent and that said Letters Patent is hereby corrected as shown below:

In the Claims

In Claim 10, Column 29, Line 3, please change "C SI" to "CSI"

In Claim 14, Column 29, Line 56, please change "fedback" to "feedback"

In Claim 15, Column 29, Line 66, please delete the second occurrence of the words "to a"

In Claim 25, Column 31, Line 27, please change "C SI" to "CSI"

In Claim 28, Column 32, Lines 22 and 23, please change "pre coding" to "precoding" at both instances Signed and Sealed this
Nineteenth Day of May, 2015

Michelle K. Lee
*Director of the United States Patent and Trademark Office*